(12) United States Patent
Ludwig

(10) Patent No.: US 10,488,827 B2
(45) Date of Patent: Nov. 26, 2019

(54) ADAPTIVE MULTI-LEVEL CONTROL FOR VARIABLE-HIERARCHY-STRUCTURE HIERARCHICAL SYSTEMS

(71) Applicant: Lester F. Ludwig, San Antonio, TX (US)

(72) Inventor: Lester F. Ludwig, San Antonio, TX (US)

(73) Assignee: NRI R&D Patent Licensing, LLC, San Antonio, TX (US)

(*) Notice: Subject to any disclaimer, the term of this patent is extended or adjusted under 35 U.S.C. 154(b) by 509 days.

(21) Appl. No.: 13/769,183

(22) Filed: Feb. 15, 2013

(65) Prior Publication Data
US 2013/0211553 A1   Aug. 15, 2013

Related U.S. Application Data

(60) Provisional application No. 61/599,403, filed on Feb. 15, 2012.

(51) Int. Cl.
 *G05B 11/01* (2006.01)
 *G05B 11/42* (2006.01)
 *G05B 19/418* (2006.01)

(52) U.S. Cl.
 CPC .............. *G05B 11/01* (2013.01); *G05B 11/42* (2013.01); *G05B 19/418* (2013.01); *Y02P 90/02* (2015.11); *Y02P 90/18* (2015.11)

(58) Field of Classification Search
 USPC .................................................. 700/20; 3/20
 See application file for complete search history.

(56) References Cited

U.S. PATENT DOCUMENTS 4,347,564 A * 8/1982 Sugano et al. ............... 700/3
7,117,049 B2  10/2006 Horn et al.
(Continued)

OTHER PUBLICATIONS

Igor Podlubny, "Fractional-Order Systems and PI_D_—Controllers" 1999 IEEE.*
(Continued)

*Primary Examiner* — Carlos R Ortiz Rodriguez

(57) ABSTRACT

A hierarchical multiple-level control system approach comprising subsystems, each with their own control system, that can operate in isolation but—when interconnected or networked with additional subsystems associated with other hierarchical levels, assume their respective role in a hierarchy. Applications of the implementation include, for example, hierarchical cooling and energy harvesting systems for data centers and other applications wherein various elements in the hierarchy can be introduced and/or removed in arbitrary order. Additional applications of the implementation include networked high-reliability control systems, robotics systems, networked sensor systems, adaptive communications networks, high-reliability communications networks, and command-and-control applications. Provisions are included in the hierarchical and/or subsystem control systems for model-based control, Proportional-Integral-Derivative (PID) controllers, fractional order controllers, saturation compensators, hysteretic controllers, sliding mode controllers, and other approaches. The dynamics within various subsystems can comprise or be structured as linear systems, bilinear systems, nonlinear systems, hysteretic systems, time-delay systems, fractional order systems, etc.

10 Claims, 18 Drawing Sheets

(56) References Cited

U.S. PATENT DOCUMENTS

| | | |
|---|---|---|
| 7,309,828 B2 | 12/2007 | Ludwig |
| 7,437,203 B2 | 10/2008 | O'Donnell et al. |
| 7,747,767 B2 * | 6/2010 | Johnson .................. H04L 69/22 709/201 |
| 8,706,449 B2 | 4/2014 | Ludwig |
| 8,996,139 B2 | 3/2015 | Jordan et al. |
| 9,596,301 B2 | 3/2017 | Mosier et al. |

OTHER PUBLICATIONS

Jun Oh Jang, "Neural Network Saturation Compensation for DC Motor Systems", 2007 IEEE.*
Leitao et al., "ADACOR: A holonic architecture for agile and adaptive manufacturing control", Elsevier 2006.*
Burnham et al., "A Bilinear controller with PID Structure", 1999 AACC.*
U.S. Appl. No. 61/443,701, filed Feb. 16, 2011.

* cited by examiner

Interior graphic adapted from Figure 1.2 of P. Lima, G. Saridis, *Design of Intelligent Control Systems Based On Hierarchical Stochastic Automata*, World Scientific Publishing Co. 1996.

Adapted from Figure 1.3 of P. Lima, G. Saridis, *Design of Intelligent Control Systems Based On Hierarchical Stochastic Automata*, World Scientific Publishing Co. 1996.

Adapted from C. Brosilow and B. Joseph, *Techniques of Model-Based Control*, Prentice Hall, 2002

Adapted from C. Brosilow and B,Joseph, *Techniques of Model-Based Control*, Prentice Hall, 2002

ADAPTIVE MULTI-LEVEL CONTROL FOR VARIABLE-HIERARCHY-STRUCTURE HIERARCHICAL SYSTEMS

CROSS-REFERENCE TO RELATED APPLICATIONS

Pursuant to 35 U.S.C. Section 119(e), this application claims benefit of priority from Provisional U.S. Patent application Ser. No. 61/599,403, filed Feb. 15, 2012, the contents of which are incorporated by reference in their entirety.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND

Field

Aspects of the example implementations pertain to the area of control systems, and more specifically to decentralized and/or hierarchical multiple-level control systems for a plurality of separately operable subsystems that each comprise an associated separately operable control system.

Overview

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

An aspect pertains to the area of decentralized and/or hierarchical multiple-level control systems and to the structure, operation, design, and use of a plurality of subsystems having their own associated control system, wherein each subsystem can operate in isolation via its own internal control system, but when interconnected or networked with additional subsystems in the plurality, each subsystem in the resulting collection of subsystems will assume a respective role in a hierarchy.

In an aspect, a decentralized and/or hierarchical multiple-level control system comprises a plurality of subsystems, each with their own control system, that can operate in isolation and which can be interconnected or networked with additional subsystems associated with other hierarchical levels.

In other aspects, a decentralized and/or hierarchical multiple-level control system comprises a plurality of subsystems, each with their own control system, that can operate in isolation but when interconnected or networked with additional subsystems associated with other hierarchical levels, each subsystem will assume their respective role in the hierarchy with respect to (those) additional subsystems.

Provisions are included for subsystem control systems for model-based control, Proportional-Integral-Derivative (PID) controllers, fractional order controllers, saturation compensators, hysteretic controllers, sliding mode controllers, and other approaches. The aspect further provides for dynamics within various subsystems to comprise or be structured as linear systems, bilinear systems, nonlinear systems, hysteretic systems, time-delay systems, fractional order systems, etc.

An example application includes, for example, hierarchical cooling and energy harvesting systems for data centers and other applications wherein various elements in the hierarchy can be introduced and/or removed arbitrarily, for example as taught in pending U.S. patent application Ser. No. 13/385,411, the contents of which is incorporated herein by reference in its entirety. Additional applications of the invention include networked high-reliability control systems, robotics systems, networked sensor systems, adaptive communications networks, high-reliability communications networks, and command-and-control applications.

BRIEF DESCRIPTION OF THE DRAWINGS

The above and other aspects and features will become more apparent upon consideration of the following description of embodiments taken in conjunction with the accompanying drawing figures, wherein.

DETAILED DESCRIPTION

Figure 1:
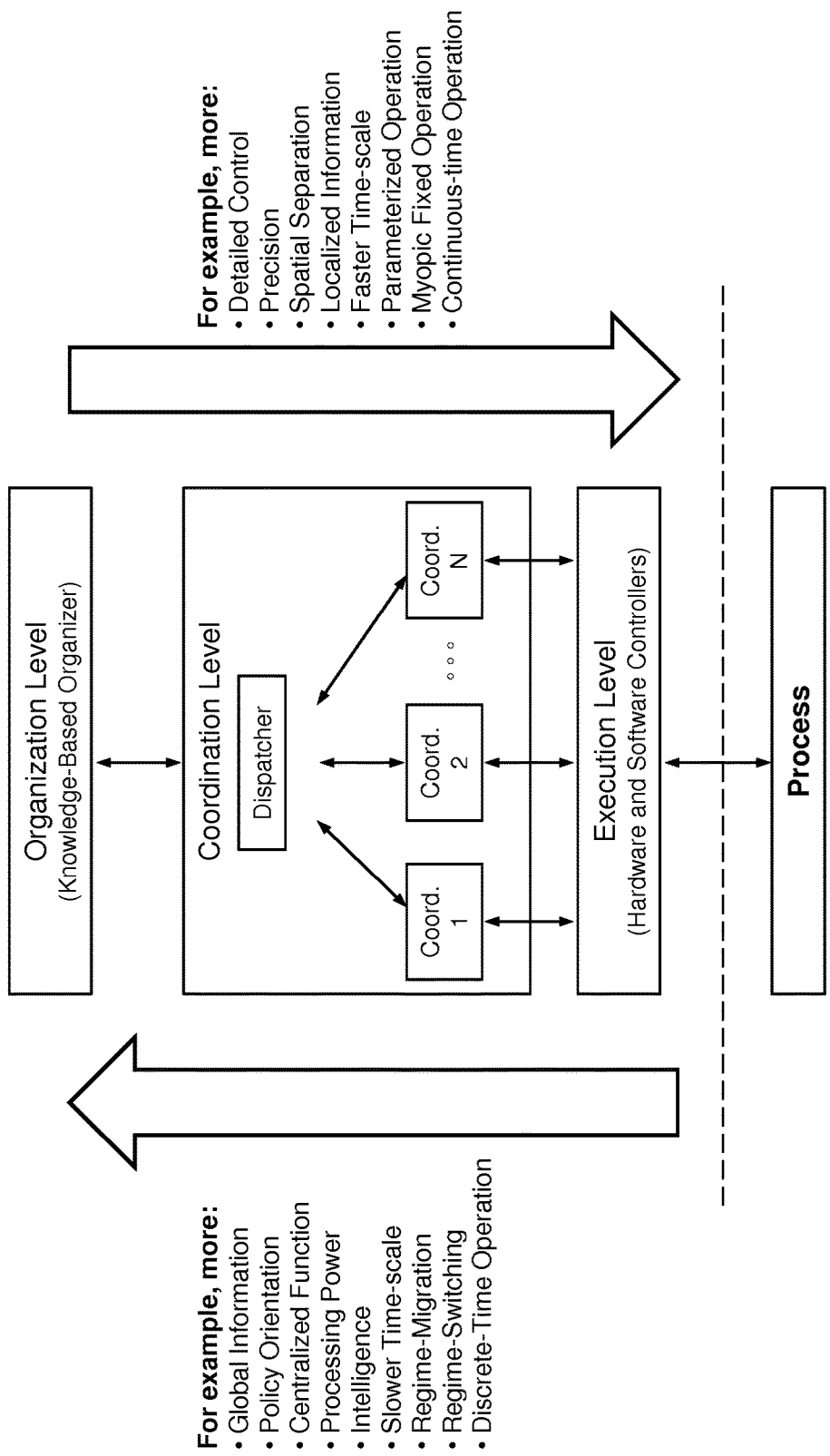
FIG. 1, adapted in part from FIG. 1.2 of P. Lima, G. Saridis, *Design of Intelligent Control Systems Based On Hierarchical Stochastic Automata*, World Scientific Publishing Co. 1996, depicts example related art motivations and needs for hierarchical control systems.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the inventive concept.

In the following description, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

The example implementation pertains to the area of decentralized and/or hierarchical multiple-level control systems and to the structure, operation, design, and use of a plurality of subsystems having their own associated control system, wherein each subsystem can operate in isolation via its own internal control system, but when interconnected or networked with additional subsystems in the plurality, each subsystem in the resulting collection of subsystems will assume a respective role in a hierarchy.

Provisions are included in the invention for the control systems for model-based control, Proportional-Integral-Derivative (PID) controllers, fractional order controllers, saturation compensators, hysteretic controllers, sliding mode controllers, and other approaches. The invention further provides for dynamics within various subsystems to comprise or be structured as linear systems, bilinear systems, nonlinear systems, hysteretic systems, time-delay systems, fractional order systems, etc.

1. Background

To begin, it is noted that various types of decentralized systems, and to a lesser extent hierarchical systems, have been studied academically and implemented in industry for many years. Underlying systems can be decentralized for reasons such as spatial-distributed or geographic-distributed deployment. Underlying systems can be hierarchically organized driven by function such as distribution, aggregation, command and control, etc.

In these efforts, some attention has been directed to control systems for the decentralized or hierarchical operation of decentralized systems and the decentralized or hierarchical operation of hierarchical systems. In many cases, systems can simultaneously be both decentralized and hierarchical. Similarly, control systems can simultaneously be both decentralized and hierarchical.

In general, the organization of a control system for an underlying system is not necessarily the same as that of the underlying system being controlled. For example, an underlying system can be unitary (i.e., not distributed) but a hierarchical control system is used in the control of that underlying unitary system for reasons such as architectural layering, separation of policy from operations, separation of continuous-time control from discrete-time control, separation into layers each operating at a progressively slower or progressively faster operating rate, etc. As a related example, underlying system can be unitary (i.e., not distributed) but a decentralized control system is used in the control of that underlying unitary system for reasons such as remote or collaborative operation, fail-safe backup, multi-entity security, etc. In the other extreme form these examples, a hierarchically or decentralized system can be controlled by a unitary (i.e., entirely centralized) control system.

Hierarchical control has been active use in business, military, government, church, and social operations for ages. With regards to formal hierarchical control systems pertaining to implementation in machines or on computers, there are several major areas of academic interest and/or commercial practice. One of these major areas is of course is the layered protocol architecture of the internet and other types of computer networks. Prior to and contemporary with layered communication protocol architecture is the academic work in hierarchical multilevel systems by M. D. Mesarovic and others (circa 1962-1970), academic work in dynamic hierarchical control such as that by M. G. Singh and others (circa 1971-1977), and academic work in control and coordination in hierarchical systems such as that by W. Findeisen and others (circa 1974-1980). More recently active academic work in formal hierarchical control systems pertaining to implementation in machines or on computers has shifted to:

so-called "hybrid systems" where supervisor-level control is typically implemented as discrete-time control system algorithms executing on computers or embedded controllers while process-level is typically implemented in whole or in part in continuous-time, and learning systems and related areas in stochastic automata.

FIG. 1, adapted in part from FIG. 1.2 of P. Lima, G. Saridis, *Design of Intelligent Control Systems Based On Hierarchical Stochastic Automata*, World Scientific Publishing Co. 1996 and further augmented with lists, depicts example attribute gradients that create motivations and/or invoke needs for hierarchical control systems. For example, some representative attributes that tend to migrate to command or organization levels (which are usually regarded as highest levels in a hierarchy) include:

Global Information
Policy Orientation
Centralized Function
Processing Power and/or Intelligence
Slower Time-scale
Regime-Migration or Regime-Switching
Discrete-Time Operation while some representative attributes that tend to migrate to execution or process levels (which are usually regarded as lowest levels in a hierarchy) include:

Detailed Control
Precision
Spatial Separation
Localized Information
Faster Time-scale
Parameterized Operation
Myopic Fixed Operation
Continuous-time Operation.

The graphic example provided in FIG. 1 has a stochastic automata and computer science orientation and is merely for example orientation. For example, the situation depicted in the graphic example can be completely irrelevant to many reasons why a hierarchical control system is used or needed, for example cases resulting from differing reaction time-scales, from boundaries between continuous-time control and discrete-time control, switching among myopic operating regimes, etc.

Figure 2:
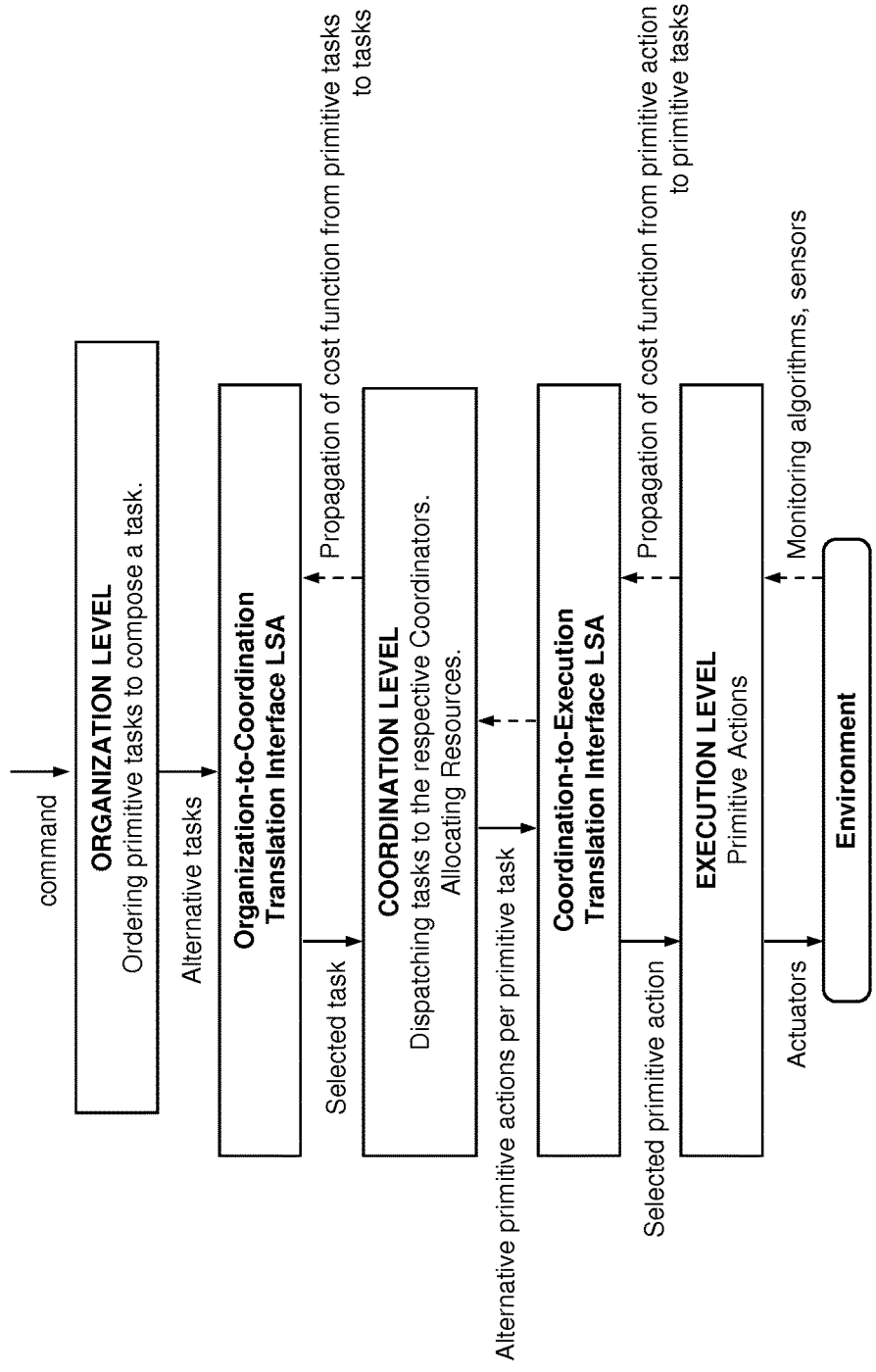
FIG. 2, adapted from FIG. 1.3 of P. Lima, G. Saridis, *Design of Intelligent Control Systems Based On Hierarchical Stochastic Automata*, World Scientific Publishing Co. 1996, depicts an example of a hierarchical control framework in related art academic learning systems and stochastic automata approaches.
Figure 3:
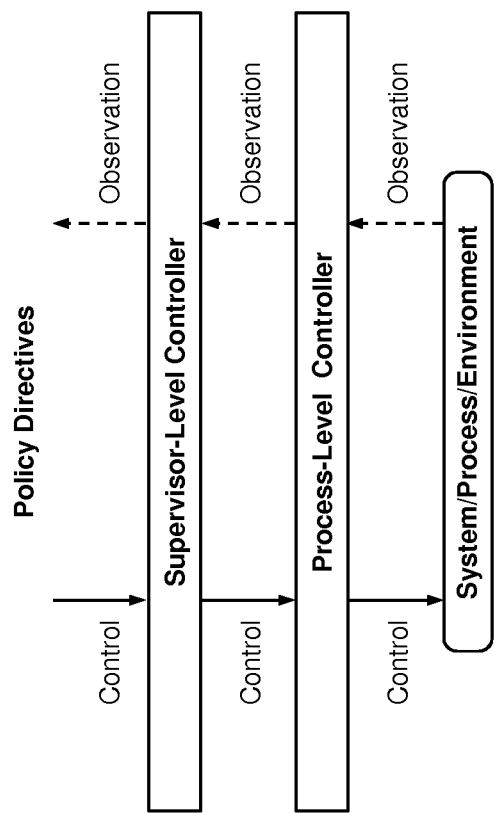
FIG. 3 depicts an example representation of a two-level hierarchical control framework in related art academic "hybrid systems" approaches where supervisor-level control is typically implemented as discrete-time control system algorithms executing on computers or embedded controllers while process-level is typically implemented in whole or in part in continuous-time.

Related to the example provided in FIG. 1, however, is the example of FIG. 2, adapted from FIG. 1.3 of P. Lima, G. Saridis, *Design of Intelligent Control Systems Based On Hierarchical Stochastic Automata*, World Scientific Publishing Co. 1996, which depicts an example hierarchical control framework popular in contemporary academic learning systems and stochastic automata approaches. Unrelated to the example provided in FIG. 1 is the example of FIG. 3 which depicts an example representation of a two-level hierarchical control framework popular in contemporary academic "hybrid systems" approaches. In these, supervisor-level control is typically implemented as discrete-time control system algorithms executing on computers or embedded controllers, or a related or unrelated finite state-space Markov chain, while process-level is typically regarded as implemented in whole or in part in continuous-time. These examples are typically restricted, respectively, to three levels (for learning systems and stochastic automata approaches) and two levels (for "hybrid systems" approaches.)

2. General Topological, Communications, and Hierarchical Framework

In the discussion below, the terms "control systems" and "controllers" will be used interchangeable, this in keeping with standardized usage well-know to those skilled in the art of control systems.

Additionally, in various embodiments one, some, or all such "control systems"/"controllers" will comprise at least a 'logical component' governing configuration, negotiation, communications management, executive functions, etc. and a 'dynamics component' providing actual control functions.

Further, in various embodiments one, some, or all such "control systems"/"controllers" will comprise a 'dynamics component' that is responsive to incoming observation information, control policy information, parameters, set-point information, etc.

Yet further, in various embodiments one, some, or all such "control systems"/"controllers" associated with a given subsystem will be arranged so that at least some of the incoming observation information, control policy information, parameters, set-point information, etc. is provided by, or behalf of, or in retrieved responsive to the recognition of the given subsystem.

Still further, in various embodiments one, some, or all such "control systems"/"controllers" associated with a given subsystem will be arranged so that at least some of the incoming observation information, control policy information, parameters, set-point information, etc. is provided by, or behalf of, or in retrieved responsive to one or more other "control system(s)"/"controller(s)" that are not associated with the given subsystem.

In various embodiments one, some, or all such "control systems"/"controllers" associated with a given subsystem will provide control signals, control information, parameters, etc. to controllable elements within the given subsystem.

In various embodiments one, some, or all such "control systems"/"controllers" associated with a given subsystem will provide control signals, control information, parameters, etc. to one or more other "control system(s)"/"controller(s)" that are not associated with the given subsystem.

Various embodiments provide for a control system comprising an arbitrary number, and potentially time-varying number, of hierarchical levels. For example, an underlying system comprising a plurality of subsystems that is organized as a hierarchical systems with an arbitrary number, and potentially time-varying number, of hierarchical levels can be controlled by a corresponding control system comprising a corresponding arbitrary number, and potentially time-varying number, of hierarchical levels.

Figure 4:
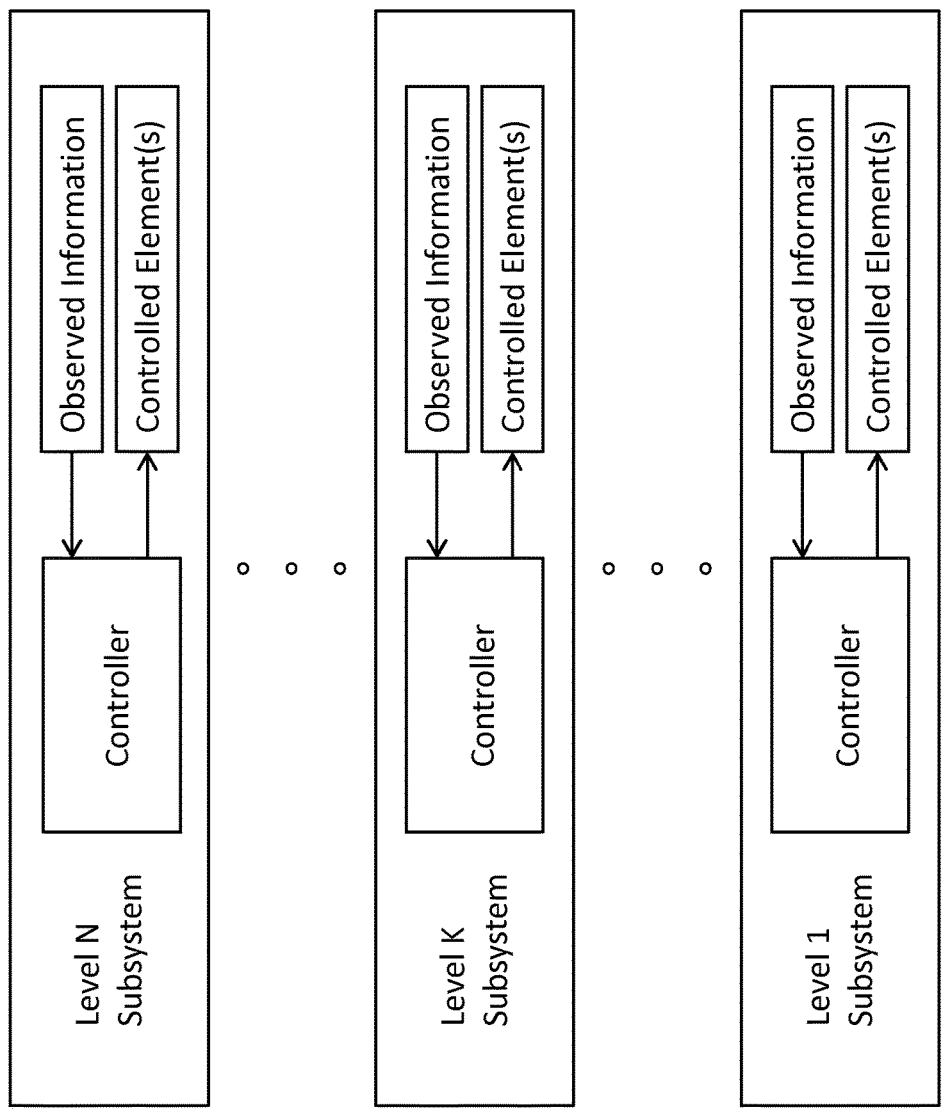
FIG. 4 depicts a representation of an example hierarchical multiple-level system comprising N levels, each level in the hierarchy comprising a single subsystem, and each single subsystem in turn comprising an associated controller.
Figure 5:
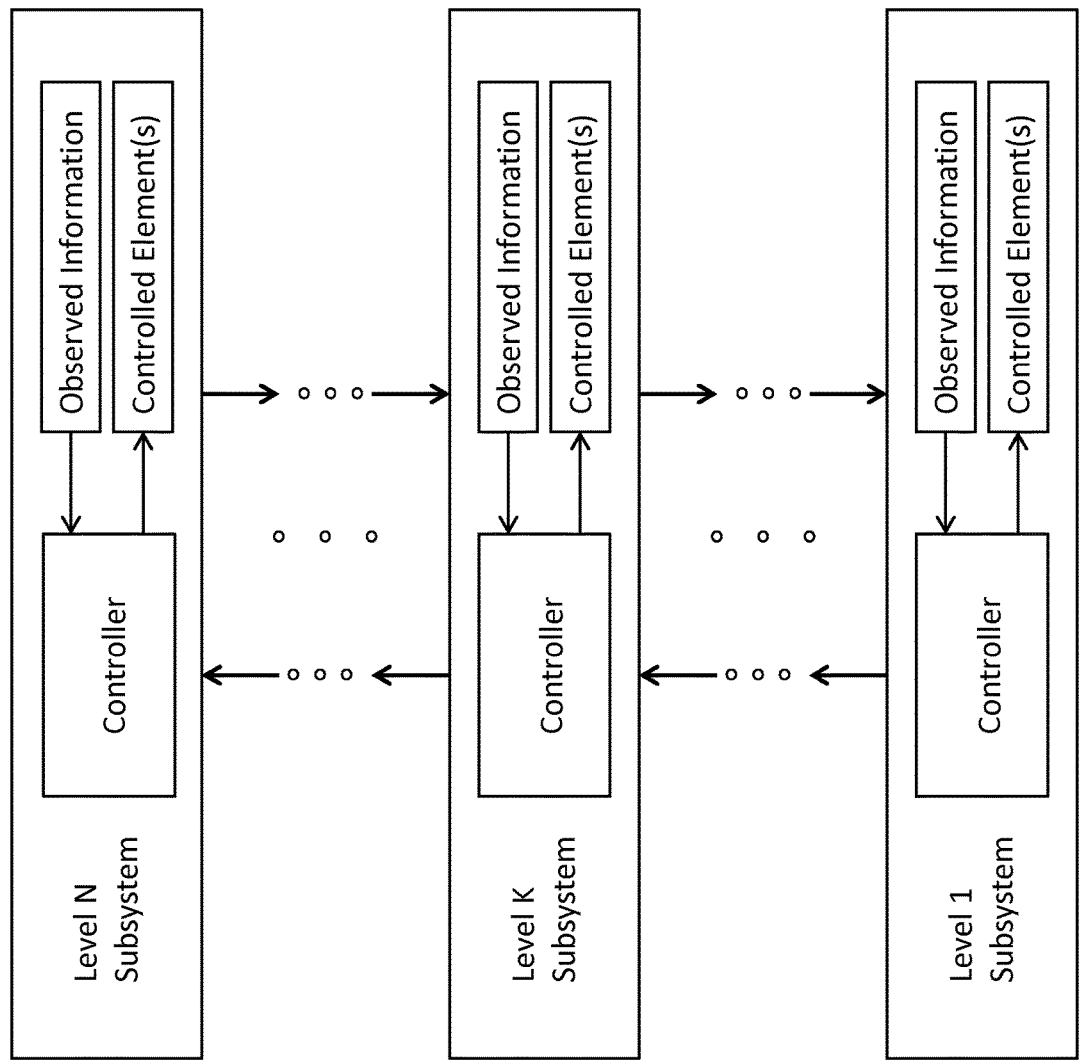
FIG. 5 depicts a representation of an example strictly-layer parent-to-child and child-to-parent communications between pairs of consecutive subsystem levels in the example hierarchy depicted in FIG. 4.

To begin, FIG. 4 depicts a representation of an example hierarchical multiple-level system comprising N levels, each level in the hierarchy comprising a single subsystem, and each single subsystem in turn comprising an associated controller. In this example there is no depicted communications between pairs of consecutive subsystems or elsewhere in the example hierarchy. As to this, FIG. 5 depicts a representation of an example strictly-layer parent-to-child and child-to-parent communications between pairs of consecutive subsystem levels in the example hierarchy depicted in FIG. 4. Example types and means of communication among control systems will be considered shortly.

Figure 6:
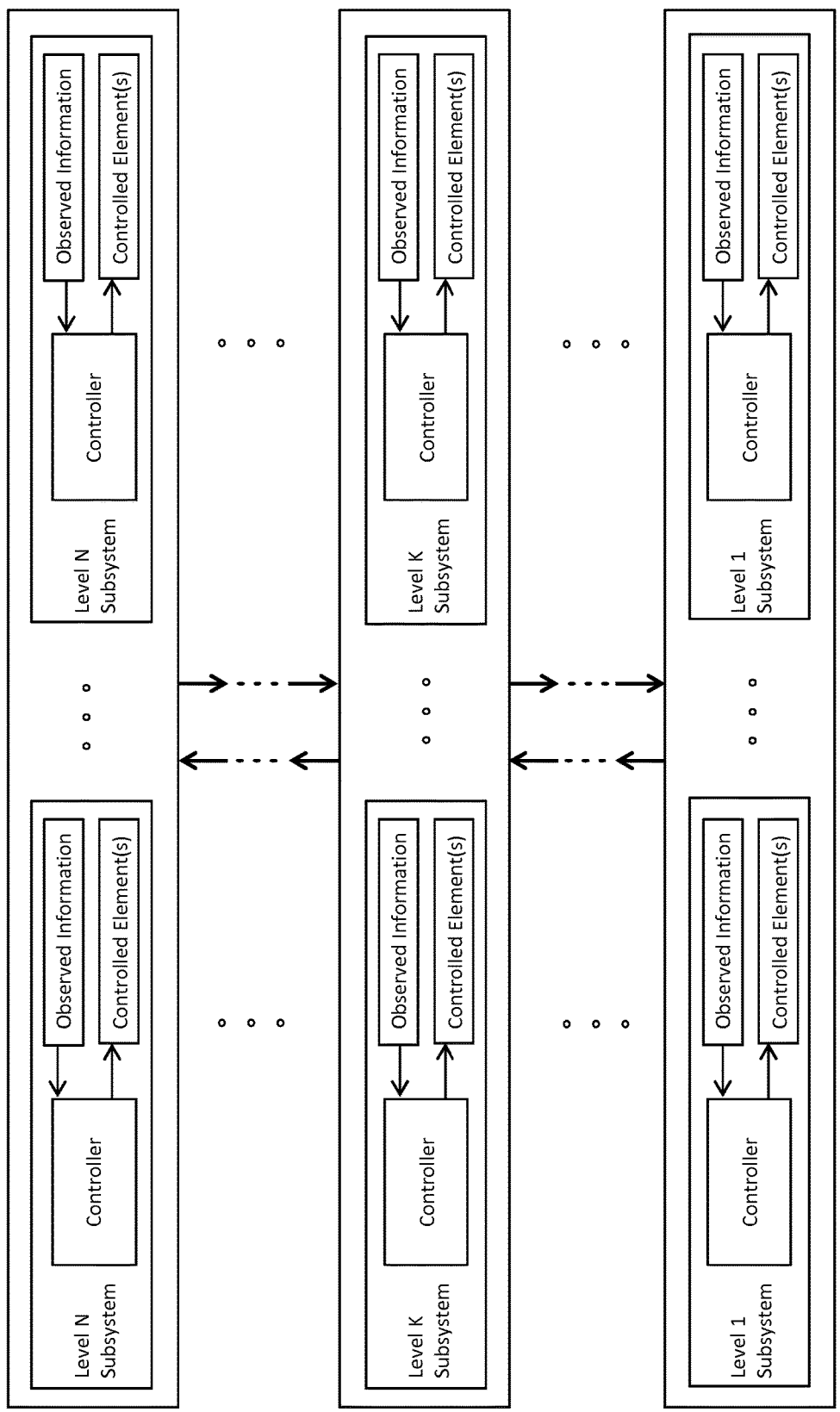
FIG. 6 depicts a variation on the representation of FIG. 5 wherein there are a plurality of subsystems associated with each level in the example hierarchy.

Each of the examples depicted in FIGS. 4 and 5 comprised a single subsystem entity within each hierarchical layer. In contrast, FIG. 6 depicts a variation on the representation of FIG. 5 wherein there are a plurality of subsystems associated with each level in the example hierarchy. The invention further provides for there being as few as a single entity in each layer. For example, using dashed lines to signify optional existence, FIG. 7 depicts a variation on the representation of FIG. 6 wherein there is at least one subsystem associated with each level in the example hierarchy.

Figure 7:
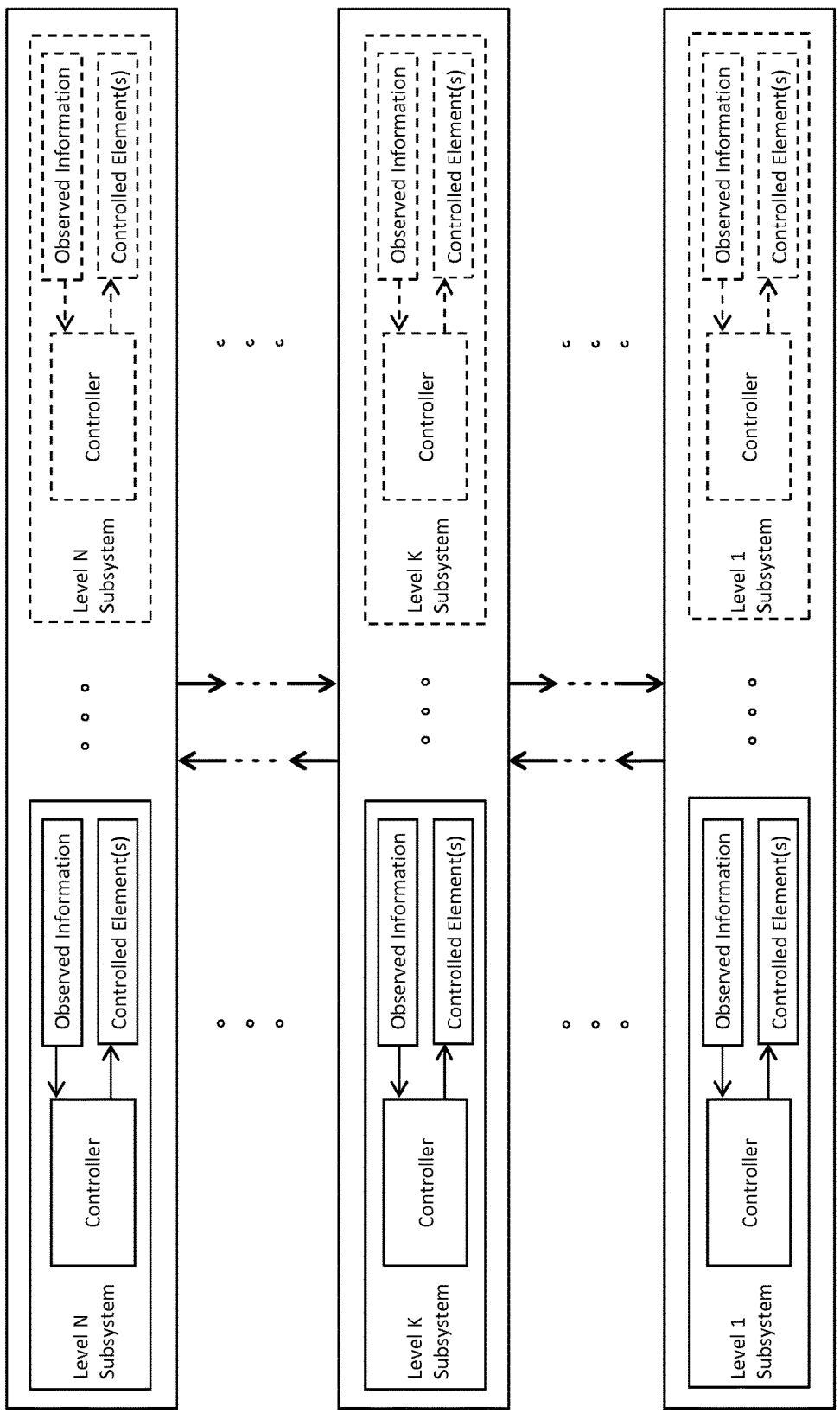
FIG. 7 depicts a variation on the representation of FIG. 6 wherein there is at least one subsystem associated with each level in the example hierarchy.

In FIG. 6 and FIG. 7, strictly-layered parent-to-child and child-to-parent communications between pairs of consecutive subsystem levels in the example hierarchy is shown. However, the invention also provides for more general communications between pairs of subsystems in levels in the example hierarchy, for example such as in the arrangements provided in FIG. 8 and FIG. 9 to be described next.

The example implementation provides for decentralized and/or hierarchical multiple-level control systems and to the structure, operation, design, and use of a plurality of subsystems having their own associated control system, wherein each subsystem can operate in isolation via its own internal control system, but when interconnected or networked with additional subsystems in the plurality, each subsystem in the resulting collection of subsystems will assume a respective role in a hierarchy.

In a further aspect, a decentralized and/or hierarchical multiple-level control system can comprise a plurality of subsystems, each with their own control system, that can operate in isolation and which can be interconnected or networked with additional subsystems associated with other hierarchical levels.

In yet other aspects, a decentralized and/or hierarchical multiple-level control system can comprise a plurality of subsystems, each with their own control system, that can operate in isolation but when interconnected or networked with additional subsystems associated with other hierarchical levels, each subsystem will assume their respective role in the hierarchy with respect to (those) additional subsystems.

Further, the invention provides for additional control systems associated with associated additional subsystems can be included. These can be introduced in established levels of the hierarchy, add new levels to the hierarchy, be or inserted within the hierarchy so as to create entirely new levels in the hierarchy.

Yet further, the example implementation provides for arrangements where one or more layers in a hierarchy of control systems can be skipped, wherein upper-hierarchy control systems and lower-hierarchy control systems (that would otherwise connect to middle-hierarchy control systems) can interact directly should there be no middle-hierarchy control system entities present.

Still further, the example implementation provides for mixed arrangements wherein there is a combination of strictly-layered parent-to-child and child-to-parent communications between pairs of consecutive subsystem levels in the hierarchy together with communications between non-consecutive subsystem levels in the hierarchy.

Figure 8:
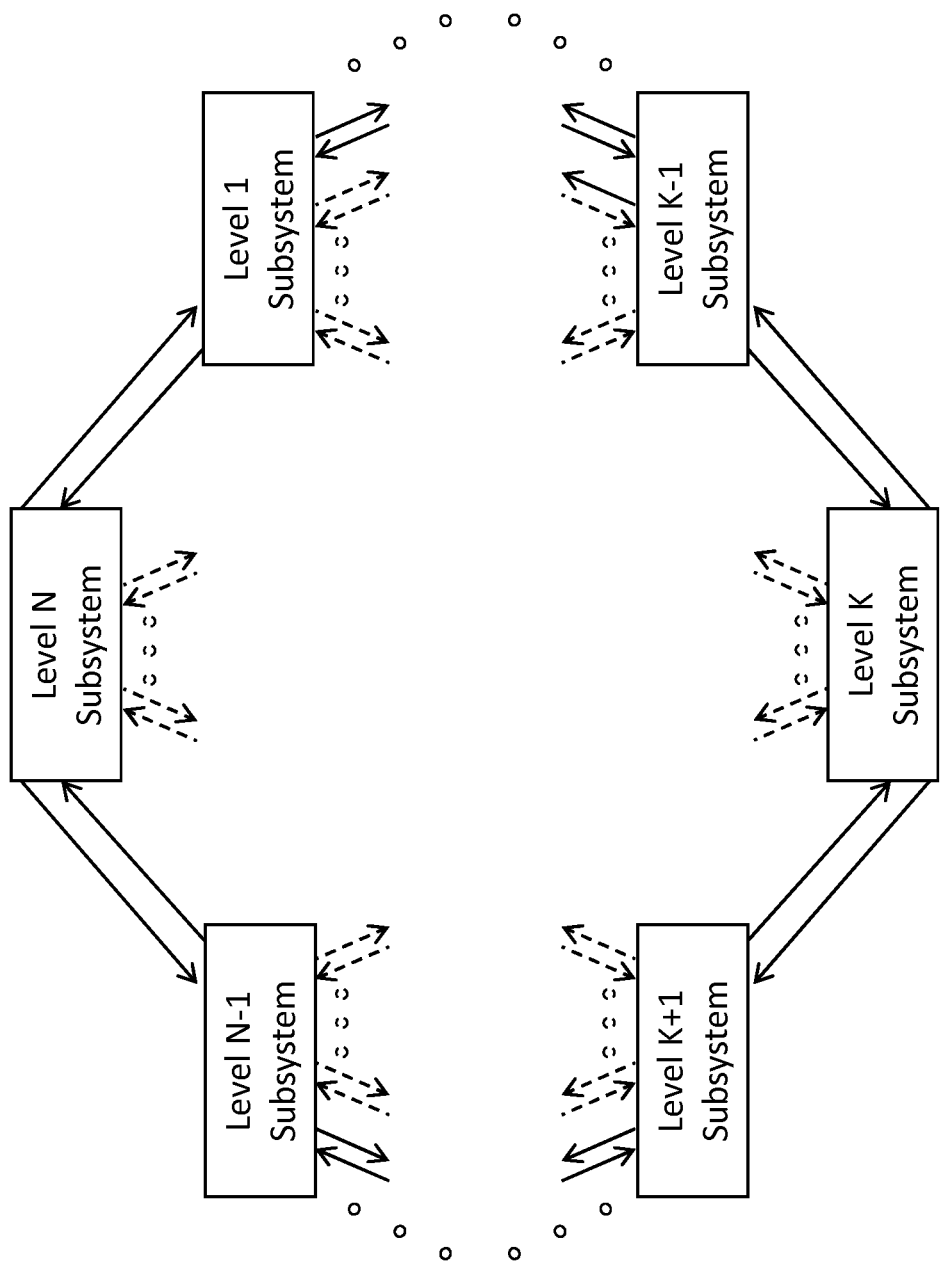
FIG. 8 depicts a representation wherein more general communications between pairs of subsystems in levels in the example hierarchy is provided for. In one extreme, all subsystems can be interconnected in a full-mesh topology.
Figure 9:
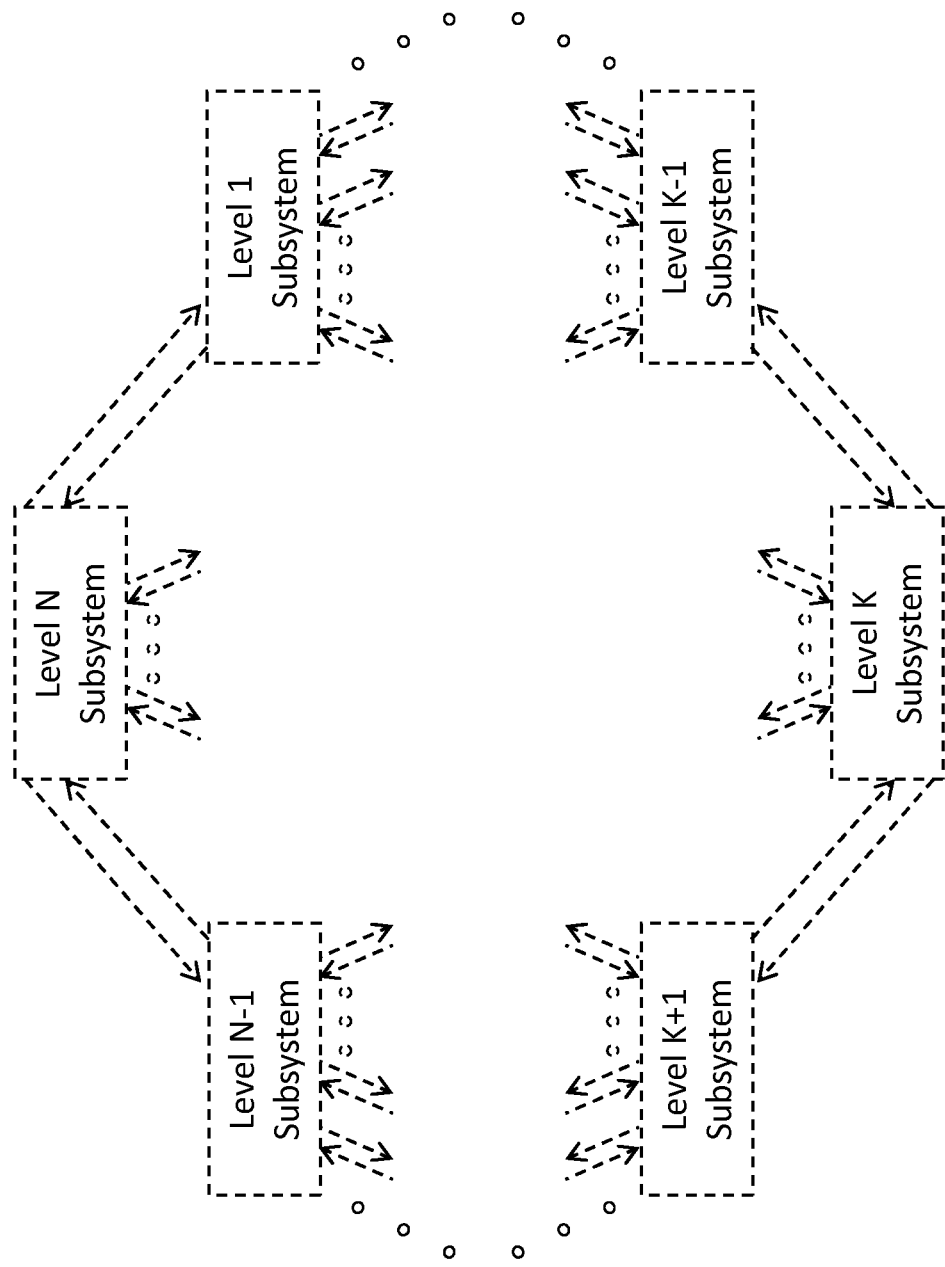
FIG. 9 depicts a variation on the representation of FIG. 8 wherein additionally only some of the subsystems associated with some of levels in the example hierarchy are present.

Accordingly, the example implementation provides for more general interconnection possibilities than strictly-layered parent-to-child and child-to-parent communications between pairs of consecutive subsystem levels. FIG. 8 depicts, for example, a representation wherein more general communications between pairs of subsystems in levels in the example hierarchy is provided for. Such an arrangement supports all the examples described above and, in the extreme, all subsystems can be interconnected in a full-mesh topology. In contrast, FIG. 9 depicts a variation on the representation of FIG. 8 wherein additionally only some of the subsystems associated with some of levels in the example hierarchy are present.

The example implementation provides for various platforms for communications among the subsystems in an aggregate system.

In one approach, interconnections among underlying subsystems provides at least a physical-level interconnection architecture. In some embodiments, the interconnections supporting communications among control systems comprised by the subsystems are used only for pair-wise communications among the associated pairs of control systems. In other embodiments, the interconnections supporting communications among control systems comprised by the subsystems are used to implement a more general communications network for communications among control systems. In yet other embodiments, a common external network can be used.

Such a network can be an IP network (such as cabled or wireless Ethernet®), a tapped bus (such as I$^2$C, Dallas One-Wire®, etc.), USB, optical fiber, radio, optical infrared, power-line carrier (as in X10®), etc. If a wired network or optical network is used, such a network can be implemented in a daisy-chain among subsystems, implemented via connection hubs or switches (Ethernet, USB, etc.).

The example implementation provides for the communications among the subsystems to include at least one or more of:
  Subsystem presence messages or indications,
  Subsystem type identification messages or indications,
  Subsystem hierarchical role identification messages or indications,
  Subsystem serial number identification messages or indications,
  Subsystem communication address identification messages or indications,
  Status messages or indications,
  Measurement information to be shared with one or more other subsystems,
  Control information directed to one or more other subsystems,
  Configuration information directed to one or more other subsystems,
  Diagnostics control and measurement information,
  Logging information,
  Timing and/or clock information,
as well as other types of messages and information exchanges.

In various embodiments, the logical aspects of the controllers can be arranged so that, when connected with other controllers, one or more various decisions, negotiations, allocations, role assignments, indices assignments, label assignments, parameter sets, configuration instructions, etc.

are enacted so as to establish the role, interconnection, configuration, proper information exchange, etc. among the individual controllers.

In various embodiments, the logical aspects of the controllers can be arranged so that, when a new controller is connected, one or more various decisions, negotiations, allocations, role assignments, indices assignments, label assignments, parameter sets, configuration instructions, etc. are enacted so as to establish and/or as necessary or advantageous modify the role, interconnection, configuration, proper information exchange, etc. among the individual controllers.

In various embodiments, the logical aspects of the controllers can be arranged so that, when one or more controller(s) is (are) disconnected, one or more various decisions, negotiations, allocations, role assignments, indices assignments, label assignments, parameter sets, configuration instructions, etc. are enacted so as to establish and/or as necessary or modify the role, interconnection, configuration, proper information exchange, etc. among the individual controllers.

In various embodiments, the logical aspects of the controllers can be arranged so that, when one or more controller(s) fail, one or more various decisions, negotiations, allocations, role assignments, indices assignments, label assignments, parameter sets, configuration instructions, etc. are enacted so as to establish and/or as necessary or advantageous modify the role, interconnection, configuration, proper information exchange, etc. among the individual controllers.

In various embodiments, the logical aspects of the controllers can be arranged so that, when controller networking connections with one or more controller(s) fail, one or more various decisions, negotiations, allocations, role assignments, indices assignments, label assignments, parameter sets, configuration instructions, etc. are enacted so as to establish and/or as necessary or advantageous modify the role, interconnection, configuration, proper information exchange, etc. among the individual controllers.

With these general networking, topology, configuration, discovery, decisions, negotiations, allocations, role assignments, indices assignments, label assignments, role, interconnection, configuration, proper information exchange, expansion, contraction, fault identification, fault recovery, and other related matters considered and discussed, attention is now directed to affairs regarding the structure, operation, variability, configuration, and other aspects of the 'dynamics component' of the controllers which provide control functions at least within the associated subsystem and, in various embodiments, to controllers associated one or more other subsystem(s).

3. Linear Controllers, Bilinear Controllers, and their Variations

Figure 10A:
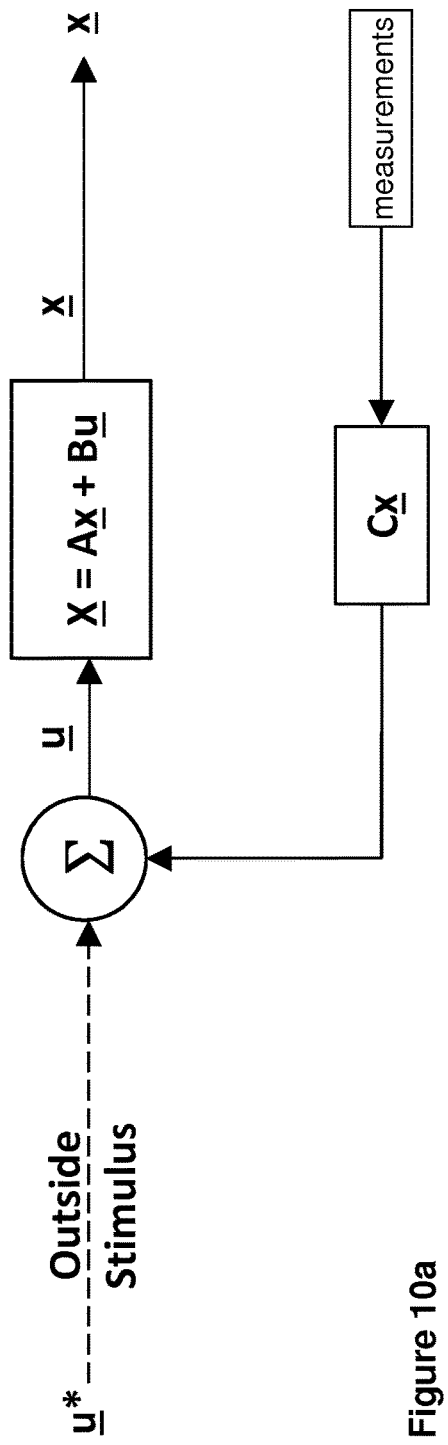
FIG. 10a depicts a representation of an example linear control system accepting outside control and measurement inputs and internal feedback paths.

Linear control systems are well-known. FIG. 10a depicts a representation of an example linear control system accepting outside control and measurement inputs and internal feedback paths. The scalar or (more typically) vector state-variable x of the control system is directed, at least in some form and/or part, to the control of at least the internals of the subsystem to which the controller is associated. Typically the controller is internally comprised within the subsystem to which the controller is associated, but this is not required. The controller can be implemented in software, firmware, digital hardware, analog hardware, or various combinations of these. The example implementation provides for the controller associated with a given subsystem to internally comprise a linear control system within the 'dynamics component' of the controller in a particular embodiment or as a general feature.

In a hierarchical control system, the outputs of one controller typically provide inputs to another controller. In one example, the input provided to the controller is treated as a type of "Outside Stimulus" input "u*" depicted in FIG. 10a. In addition, or alternatively, the invention provides for the outputs of one controller to control parameters and/or configuration of system dynamics and/or controller dynamics. Each of these is considered in the context of FIG. 10b.

Figure 10B:
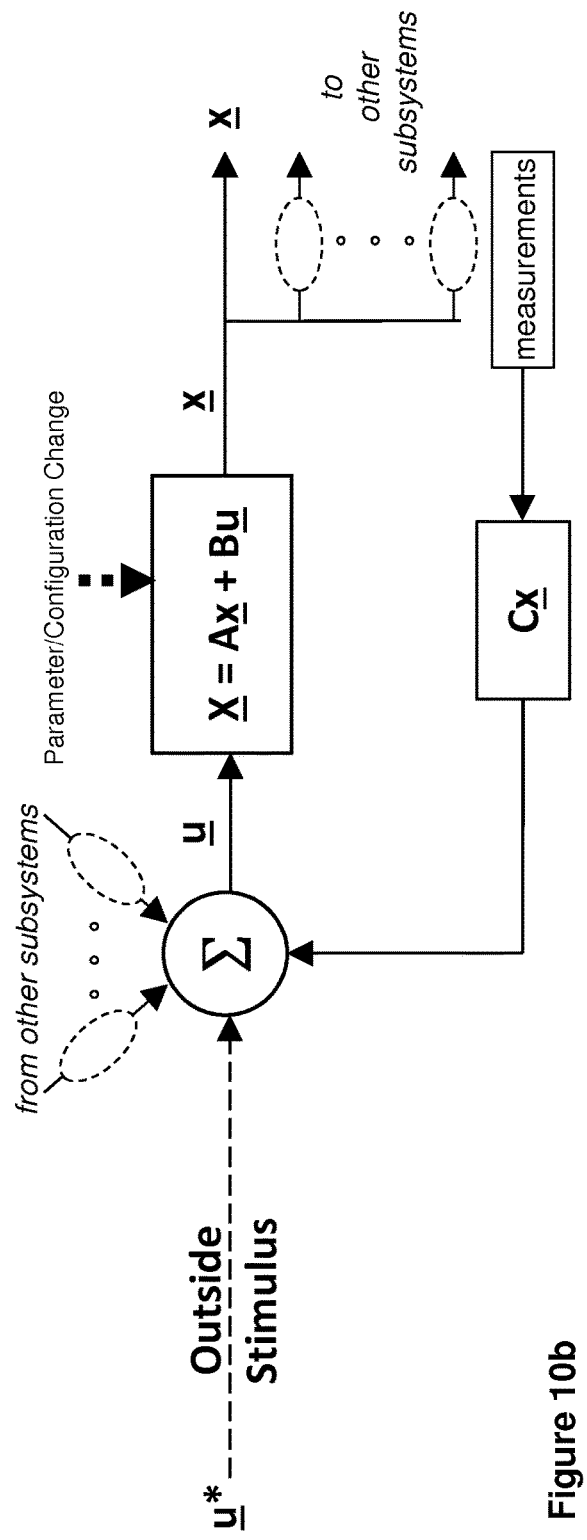
FIG. 10b depicts a representation of an example variation on the arrangement of FIG. 10a wherein additional inputs are provided by other subsystems and additional outputs are provided to other subsystems. Additionally, the representation provides for changes to parameters and/or configuration of the controller responsive to the presence or existence of other subsystems (in other layers of the hierarchy, same layer of the hierarchy, etc.) in various implementations and embodiments.

For example, FIG. 10b depicts a representation of an example variation on the arrangement of FIG. 10a wherein additional inputs are provided by other subsystems and additional outputs are provided to other subsystems. Each dashed oval represent operations such as scaling, offset, dynamical filtering, state-variable selection/suppression, etc. that can be relevant in various designs, implementations, and embodiments. The input and additional output information can be exchanged between and/or among subsystems employing one or more types of communication arrangements described earlier in Section 2.

Figure 11A:
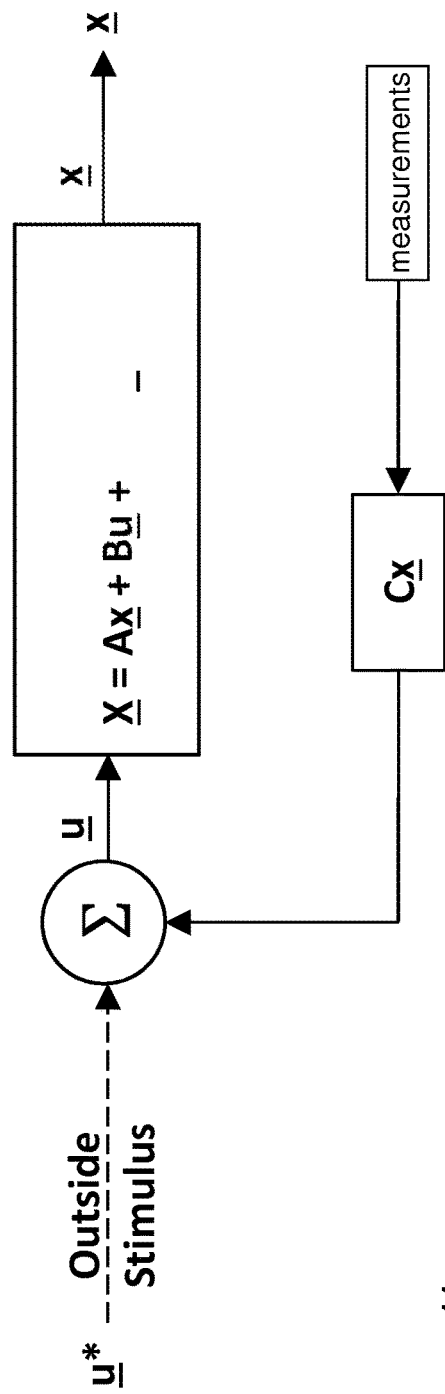
FIG. 11a depicts a representation of an example bilinear control system accepting outside control and measurement inputs and internal feedback paths.

Additionally, the representation depicted in FIG. 10b provides for changes to parameters and/or configuration of the system dynamics and/or controller dynamics responsive to the presence or existence of other subsystems (in other layers of the hierarchy, same layer of the hierarchy, etc.) in various implementations and embodiments. A formal way to model provisions for making changes to parameters and/or configuration of the system dynamics and/or controller dynamics is with the somewhat obscure "bilinear control system" representation. FIG. 11a depicts a representation of an example bilinear control system accepting outside control and measurement inputs and internal feedback paths. The scalar or (more typically) vector state-variable x of the control system is directed, at least in some form and/or part, to the control of at least the internals of the subsystem to which the controller is associated. Typically the controller is internally comprised within the subsystem to which the controller is associated, but this is not required. The controller can be implemented in software, firmware, digital hardware, analog hardware, or various combinations of these. The invention provides for the controller associated with a given subsystem to internally comprise a bilinear control system within the 'dynamics component' of the controller in a particular embodiment or as a general feature.

Additionally, it is noted that bilinear control systems provide a natural framework for implementing piecewise-linear control systems as can be seen from the product terms involve products of state variables and bilinear control inputs. Additionally, it is noted that bilinear control systems provide a natural framework for approximating nonlinear systems. This property is so strong that, in terms of formal operator analysis and families of differential equations, the set of bilinear control systems is topological dense in the set of nonlinear systems (as proved by Sussman).

It is further noted that bilinear control systems have special behavior properties that differ from that of linear systems and can be characterized in terms of Lie algebras generated by matrices associated with the bilinear system representation. These can be used to analyze and characterize the behavior of this important type of hierarchical control of linear dynamics.

Figure 11B:
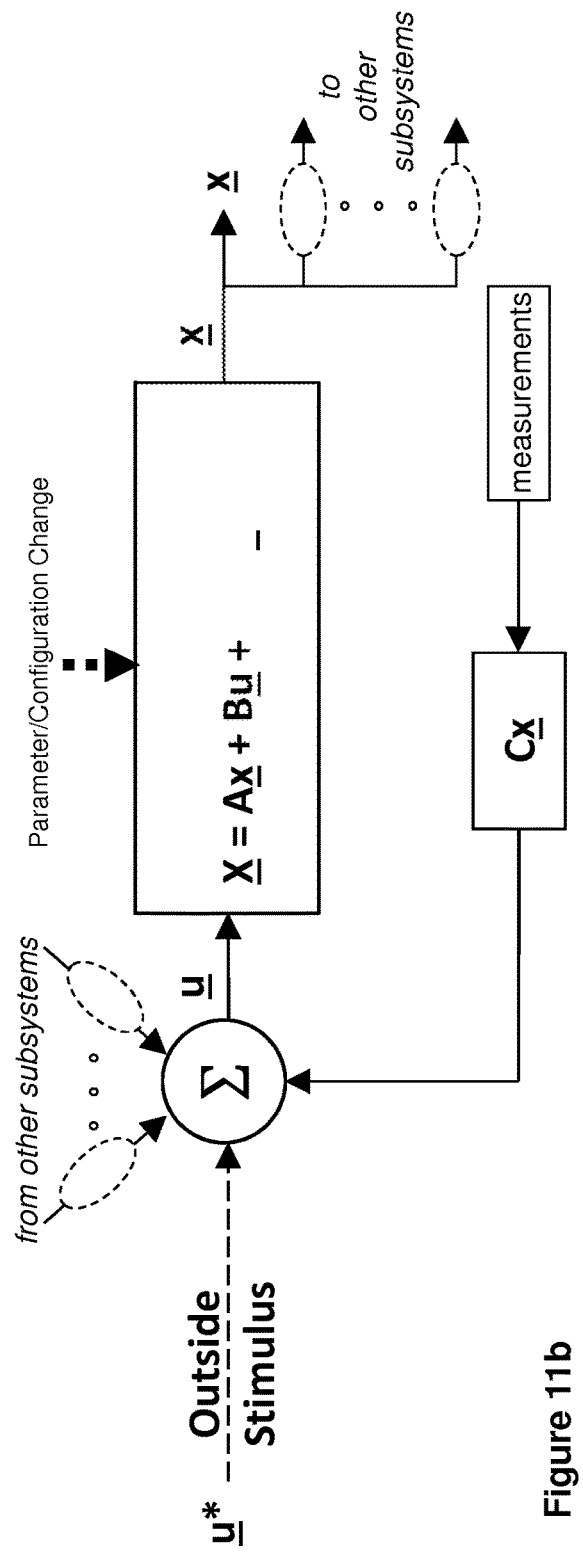
FIG. 11b depicts a representation of an example variation on the arrangement of FIG. 11a wherein additional inputs are provided by other subsystems and additional outputs are provided to other subsystems. Additionally, the representation provides for changes to parameters and/or configuration of the controller responsive to the presence or existence of other subsystems (in other layers of the hierarchy, same layer of the hierarchy, etc.) in various implementations and embodiments.

FIG. 11b depicts a representation of an example variation on the arrangement of FIG. 11a wherein additional inputs are provided by other subsystems and additional outputs are provided to other subsystems. Each dashed oval represent operations such as scaling, offset, dynamical filtering, state-variable selection/suppression, etc. that can be relevant in various designs, implementations, and embodiments. The additional input and additional output information can be exchanged between and/or among subsystems employing one or more types of communication arrangements described earlier in Section 2. Additionally, the representation depicted in FIG. 11b provides for yet further changes to parameters and/or configuration of the controller responsive to the presence or existence of other subsystems (in other layers of the hierarchy, same layer of the hierarchy, etc.) in various implementations and embodiments.

Figure 12:
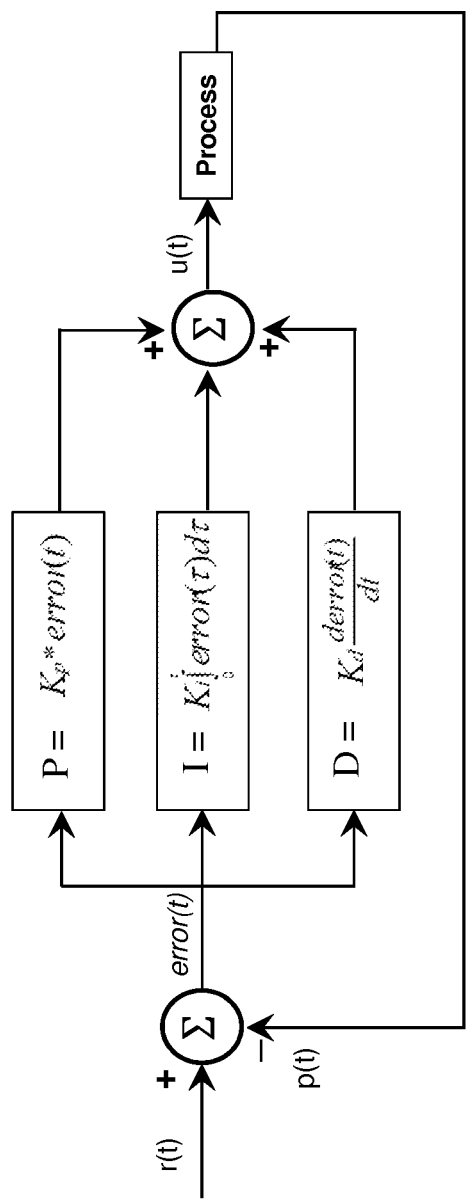
FIG. 12, adapted the figure authored by "Email4mobile" available at http://en.wikipedia.org/wiki/File:PI controller.png (visited Feb. 10, 2013) and the figure authored by available at http://en.wikipedia.org/wiki/File:PID en updated feedback.svg (visited Feb. 10, 2013), depicts an example representation of a (single-level) Proportional-Integrator-Derivative (PID) control system.

Regarding linear controllers, among the most commonly used for regulatory functions is the so-called Proportional-Integrator-Derivative (PID) control system. FIG. 12, adapted from combining the figure authored by "Email4mobile" available at http://en.wikipedia.org/wiki/File:PI controller.png (visited Feb. 10, 2013) and the figure authored by "TravTigerEE" available at http://en.wikipedia.org/wiki/File:PID en updated feedback.svg (visited Feb. 10, 2013), depicts an example representation of a (single-level) Proportional-Integrator-Derivative (PID) control system, depicts an example representation of a (single-level) Proportional-Integrator-Derivative (PID) control system. The invention provides for the controller associated with a given subsystem to internally comprise a Proportional-Integrator-Derivative (PID) control system within the 'dynamics component' of the controller in a particular embodiment or as a general feature.

Additionally, it is noted that Proportional-Integrator-Derivative (PID) control systems can experience transient behaviors referred to as "integral windup," and that Proportional-Integrator-Derivative (PID) control systems can be devised and engineered to provide "anti-windup" operation. Accordingly, the invention provides for the controller associated with a given subsystem to internally comprise a Proportional-Integrator-Derivative (PID) control systems configured to provide "anti-windup" operation within the 'dynamics component' of the controller in a particular embodiment or as a general feature.

Further, it is noted that Proportional-Integrator-Derivative (PID) control systems can be devised, engineered, and tuned for bilinear control systems. Accordingly, the invention provides for the controller associated with a given subsystem to internally comprise a Proportional-Integrator-Derivative (PID) control systems directed towards use with or within bilinear control systems within the 'dynamics component' of the controller in a particular embodiment or as a general feature.

Yet further, the example implementation provides for changes to parameters and/or configuration of Proportional-Integrator-Derivative (PID) control systems responsive to the presence or existence of other subsystems (in other layers of the hierarchy, same layer of the hierarchy, etc.) in various implementations and embodiments. As described earlier, bilinear control systems provide a natural framework for implementing piecewise-linear control systems as can be seen from the product terms involve products of state variables and bilinear control inputs, and that bilinear control systems provide a natural framework for approximating nonlinear systems.

Additionally as to bilinear control systems, it is noted that the theory and practice of sliding mode control is readily applicable to the operation of bilinear control systems. Accordingly, the example implementation provides for the controller associated with a given subsystem to internally comprise sliding mode control within the 'dynamics component' of the controller in a particular embodiment or as a general feature.

4. Nonlinear Controllers

Many underlying dynamical systems that could be comprised by a given subsystem do not have dynamics that are linear, and many of these further do not have dynamics that can operate in a region that can be adequately approximated by linear dynamics. One approach is to employ piecewise linear, parameterized linear, or bilinear control systems as described above, for example switching among overlapping linearized regimes or by employing approximations of non-linearities as described above in various manners such as will be described below. In addition, some linear dynamical systems are controlled with nonlinear controllers (for example, a thermostat with hysteresis controlling a simple heater or resistive heating element), and of these certain types of optimal control of linear dynamical system require nonlinear controllers (for example so-called "bang-bang" or "saturating" controllers in the cases of minimal fuel, minimum time, etc.). Accordingly, the example implementation provides for the controller associated with a given subsystem to internally comprise a nonlinear control system within the 'dynamics component' of the controller in a particular embodiment or as a general feature.

Figure 13A:
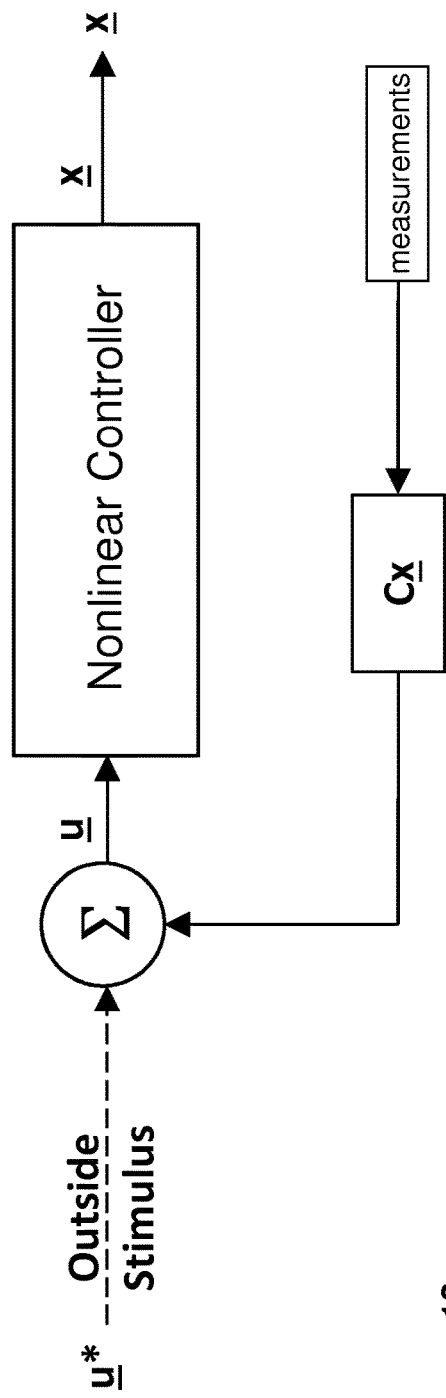
FIG. 13a depicts a representation of an example nonlinear control system accepting outside control and measurement inputs and internal feedback paths.

FIG. 13a depicts a representation of an example nonlinear control system accepting outside control and measurement inputs and internal feedback paths. The scalar or (more typically) vector state-variable x of the control system is directed, at least in some form and/or part, to the control of at least the internals of the subsystem to which the controller is associated. Typically the controller is internally comprised within the subsystem to which the controller is associated, but this is not required. The controller can be implemented in software, firmware, digital hardware, analog hardware, or various combinations of these.

Figure 13B:
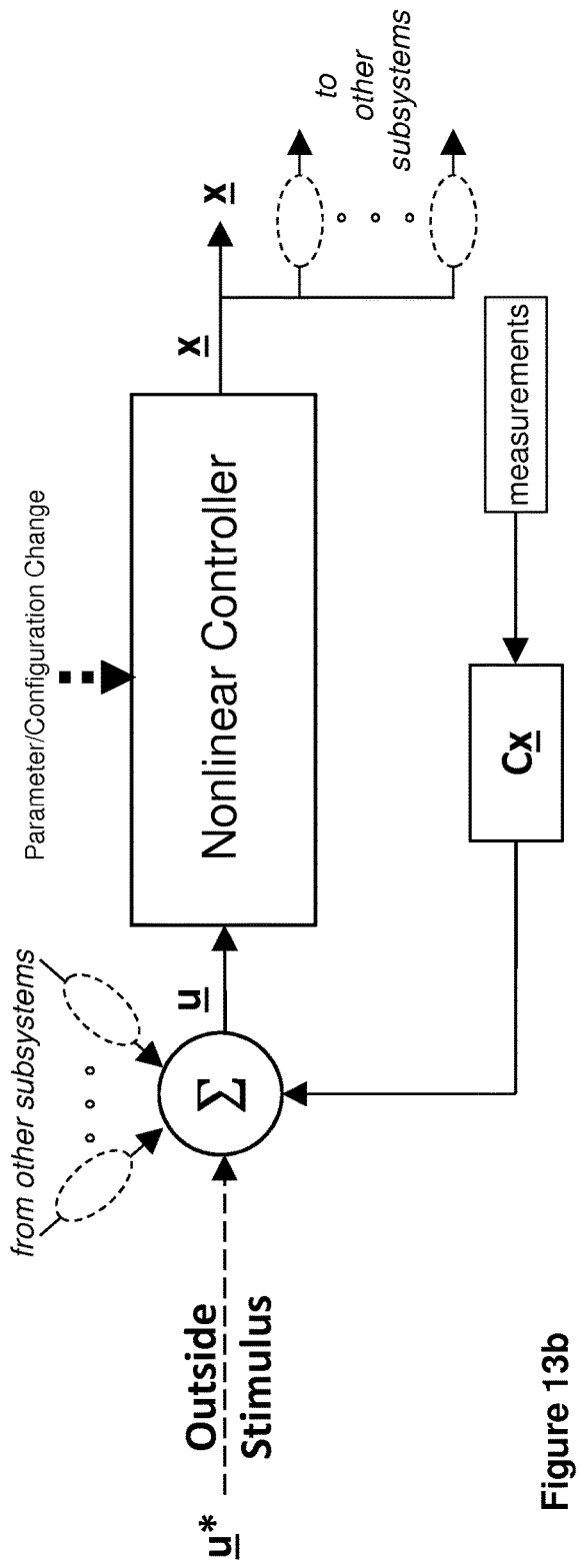
FIG. 13b depicts a representation of an example variation on the arrangement of FIG. 13a wherein additional inputs are provided by other subsystems and additional outputs are provided to other subsystems. Additionally, the representation provides for changes to parameters and/or configuration of the controller responsive to the presence or existence of other subsystems (in other layers of the hierarchy, same layer of the hierarchy, etc.) in various implementations and embodiments.

FIG. 13b depicts a representation of an example variation on the arrangement of FIG. 13a wherein additional inputs are provided by other subsystems and additional outputs are provided to other subsystems. Each dashed oval represent operations such as scaling, offset, dynamical filtering, state-variable selection/suppression, etc. that can be relevant in various designs, implementations, and embodiments. The additional input and additional output information can be exchanged between and/or among subsystems employing one or more types of communication arrangements described earlier in Section 2. Additionally, the representation depicted in FIG. 13b provides for changes to parameters and/or configuration of the controller responsive to the presence or existence of other subsystems (in other layers of the hierarchy, same layer of the hierarchy, etc.) in various implementations and embodiments.

As additional considerations, it is noted that almost all linear systems are linear only within limits—for example power supply limits, temperature limits, heat-transfer limits, motor speed limits, magnetization limits, etc. can impose 'saturation' behavior on otherwise linear dynamics. For example, the Proportional-Integrator-Derivative (PID) control systems commonly confront such limits and are often accompanied by saturation compensation provisions. Nonlinear dynamical systems also can experience 'saturation' behavior on otherwise linear dynamics. Accordingly, the invention provides for the controller associated with a given subsystem to internally comprise saturation compensation within the 'dynamics component' of the controller in a particular embodiment or as a general feature.

Further as to nonlinear control systems, it is noted that the theory and practice of sliding mode control is readily applicable to the operation of nonlinear control systems. Accordingly, the invention provides for the controller associated with a given subsystem to internally comprise sliding mode control within the 'dynamics component' of the controller in a particular embodiment or as a general feature.

5. Fractional-Order System Dynamics and Fractional-Order Controllers

Many systems employing diffusion processes, transport processes, transmission-line structures, and distributed-parameter dynamics naturally exhibit dynamic or transfer functions behavior fitting that of the fractional differential equations, fractional integral equations, and fractional integro-differential equations resulting from modeling these processes with fractional calculus or infinite-series approximation summations of impedance or dynamics terms that converge to irrational expressions, for example fractional powers of poles and/or zeros. Further, many noise processes behave as white noise processed through such dynamics, and many physical processes exhibit so-called "power-law" behaviors that comprise similar mathematical structures pertaining to frequency characteristics, Such systems and dynamics can be comprised by a given subsystem.

In some situations, such underlying system dynamics can be controlled with linear and nonlinear systems. In many cases, for example in designing compensation or when employing model-based control systems (to be described later), it can be advantageous to implement numerical approximations to fractional-order dynamics, also known as fractional-order controllers. Further, it has been empirically found that fractional-order controllers provide excellent performance in the control of complex linear systems and some types of nonlinear systems. Accordingly, the invention provides for the controller associated with a given subsystem to internally comprise a fractional-order control system within the 'dynamics component' of the controller in a particular embodiment or as a general feature.

A specific type of fractional-order controller that has proved particularly useful is the fractional-order Proportional-Integrator-Derivative (PID) control system. Accordingly, the implementation provides for the controller associated with a given subsystem to internally comprise a fractional-order Proportional-Integrator-Derivative (PID) control system within the 'dynamics component' of the controller in a particular embodiment or as a general feature.

6. Addition of Synthesized Hysteresis to Open-Loop and Closed-Loop Controllers

Many open loop systems (such motor gear chains, transformers, gears, stepper motors, etc.) inherently comprise hysteresis processes. In some situations, such underlying system dynamics can be controlled with linear and nonlinear systems. In many cases, for example in designing compensation or when employing model-based control systems (to be described later), it can be advantageous to implement numerical approximations to hysteresis processes and hysteretic dynamics. Further many detectors (such as Schmidt triggers) intentionally introduce hysteresis processes, and many closed loop systems (such as thermostats, motor-controlled position, etc.) provide benefits from utilizing hysteresis processes. Accordingly the implementation provides for the controller associated with a given subsystem to internally comprise at least one of:

Introduction of synthesized hysteresis into controllers so as to obtain better performance,
Introduction of synthesized hysteresis into controllers so as to obtain better stability,
Introduction of synthesized hysteresis into controllers so as to allow for settling times during parameter or configuration changes,
Inclusion of synthesized hysteresis in closed loop controller to compensate for inherently comprise hysteresis processes within controlled elements,
Other uses.

Systems and methods for synthesized hysteresis for use in control and other systems are taught in, for example U.S. Pat. No. 7,309,828 and pending U.S. patent application Ser. No. 13/186,459. Synthesized hysteresis can be implemented in software, firmware, digital hardware, analog hardware, or various combinations of these. The implementation provides for the controller associated with a given subsystem to internally comprise hysteresis within the 'dynamics component' of the controller in a particular embodiment or as a general feature. The implementation also provides for the controller associated with a given subsystem to internally comprise hysteresis compensation within the 'dynamics component' of the controller in a particular embodiment or as a general feature.

Figure 14A:
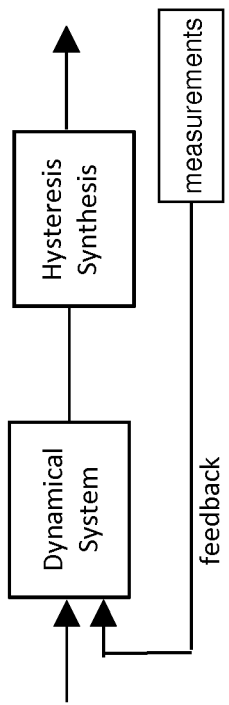
FIG. 14a depicts a representation of an example supplementing a controller with synthesized hysteresis pre-processing or pre-compensation.
Figure 15A:
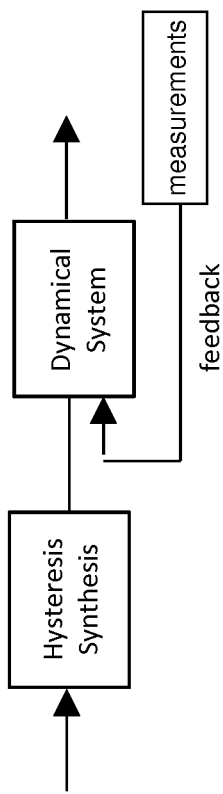
FIGS. 15a-15b depict representations of examples involving the incorporation various forms of closed loop feedback topologies comprising synthesized hysteresis processing.
Figure 14B:
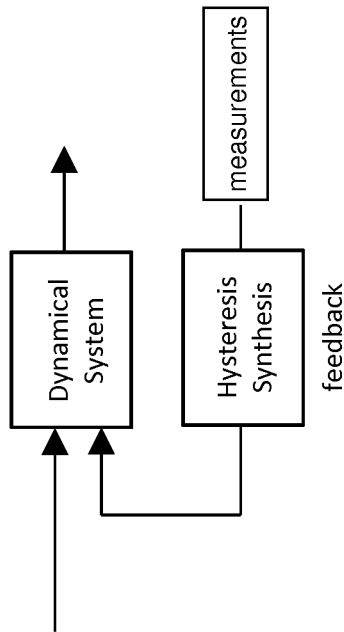
FIG. 14b depicts a representation of an example supplementing a controller with synthesized hysteresis post-processing or post-compensation.
Figure 15B:
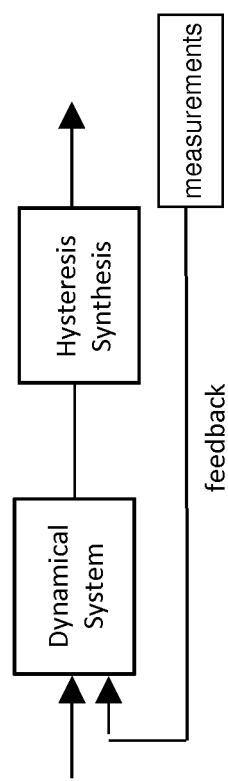
Figure 16A:
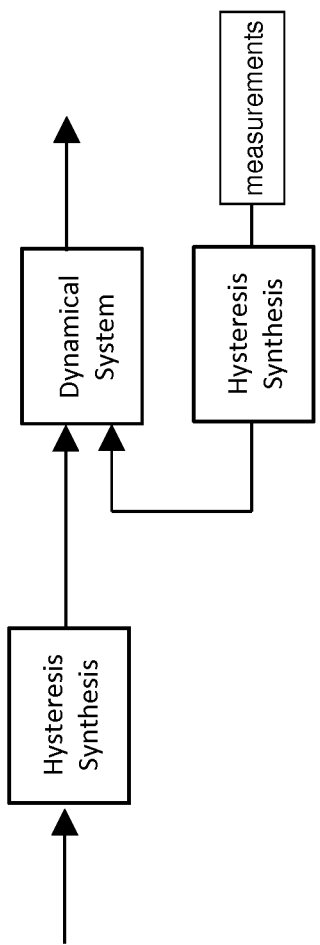
FIGS. 16a-16b depict representations of examples involving the incorporation various forms of closed loop feedback topologies comprising two instances of synthesized hysteresis processing.
Figure 16B:
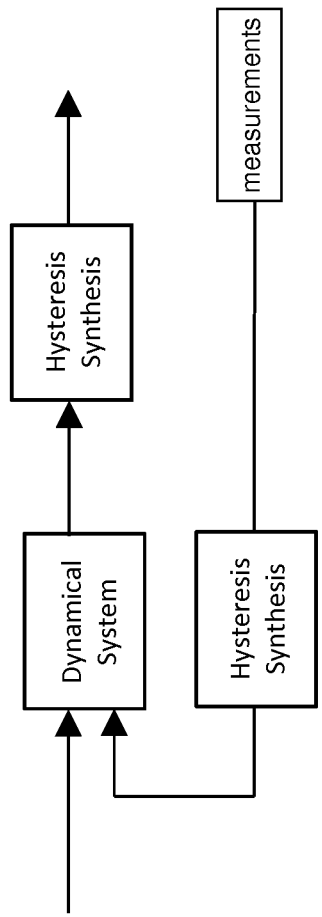
Figure 17:
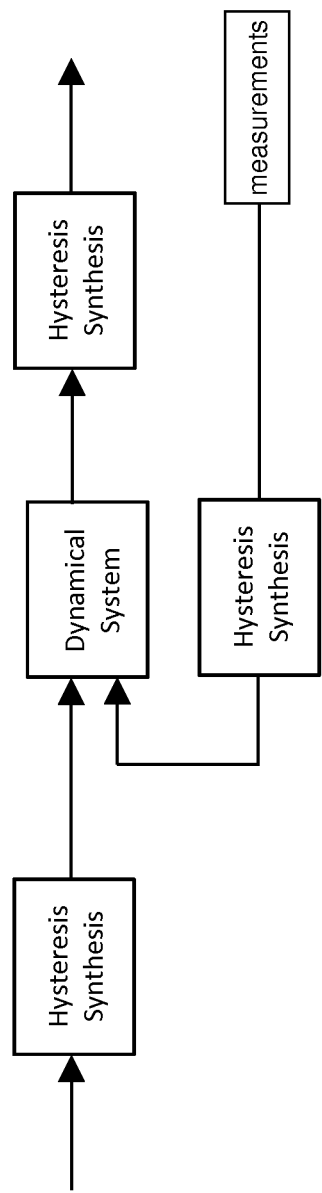
FIG. 17 depicts a representation of an example involving the incorporation of more complex closed loop feedback topologies comprising instances of synthesized hysteresis processing.

Model-based control systems will be described shortly. Alternatively, FIGS. 14a-14b, 15a-15b, 16a-16b, and 17 depict representations of example supplementations and/or incorporations of synthesized hysteresis into control system arrangements. The examples of FIGS. 14a-14b, 15a-15b, 16a-16b, and 17, for example, can be used to modify the example control arrangements depicted earlier in FIGS. 10a-10b, FIGS. 11a-11b, FIGS. 13a-13b, as well as other controller arrangements suitable for use with aspects of the implementation. FIG. 14a depicts a representation of an example supplementing a controller with synthesized hysteresis pre-processing or pre-compensation, while FIG. 14b depicts a representation of an example supplementing a controller with synthesized hysteresis post-processing or post-compensation. FIGS. 15a-15b depict representations of examples involving the incorporation various forms of closed loop feedback topologies comprising synthesized hysteresis processing, while FIGS. 16a-16b depict representations of examples involving the incorporation various forms of closed loop feedback topologies comprising two instances of synthesized hysteresis processing. As another example, FIG. 17 depicts a representation of an example involving the incorporation of more complex closed loop feedback topologies comprising instances of synthesized hysteresis processing.

7. Model-Based Controllers

Figure 18A:
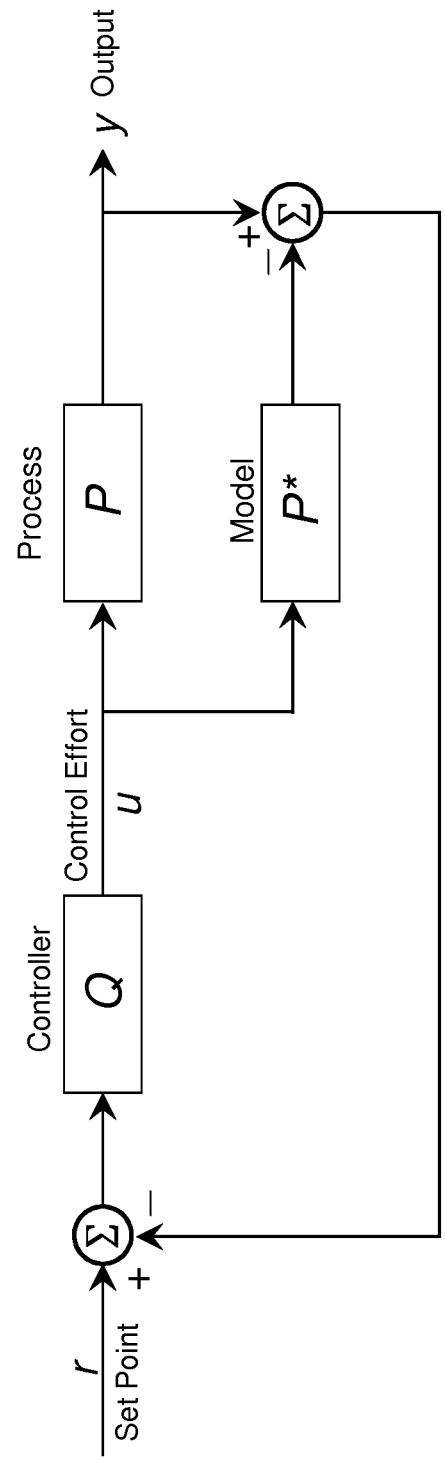
FIG. 18a, adapted and simplified from C. Brosilow and B, Joseph, *Techniques of Model-Based Control*, Prentice Hall, 2002, depicts an example representation of a (single-level) model-based control system approach.
Figure 18B:
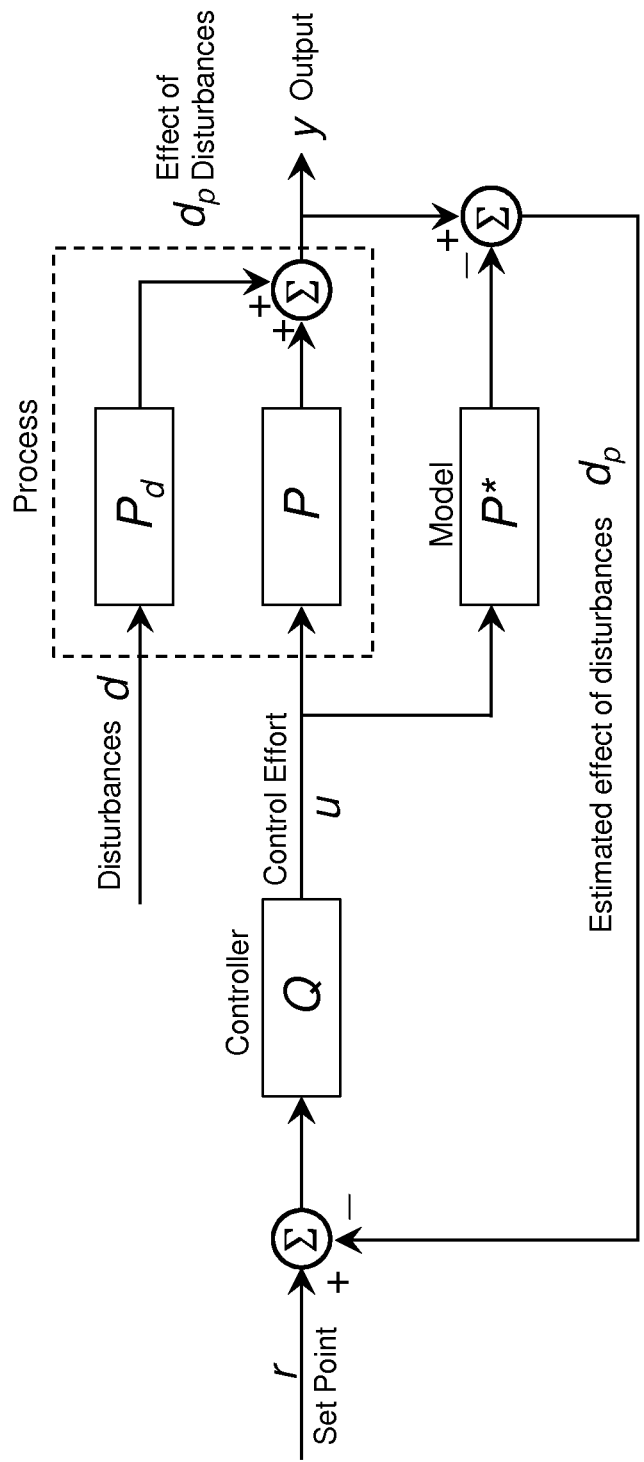
FIG. 18b, adapted from C. Brosilow and B, Joseph, *Techniques of Model-Based Control*, Prentice Hall, 2002, depicts an example variation on the arrangement depicted in FIG. 18a wherein the effects of disturbances are represented.

Although to some extent long-used traditional compensation controllers can be viewed as a simplified type of a controller based on a model of an underlying system to be controlled, the theory and practice of so-called "model-based" control systems, which uses a different topology than traditional compensation controller design, is rapidly emerging as a powerful overarching approach for building controllers for complex underlying systems. For example, FIG. 18a, adapted and simplified from C. Brosilow and B, Joseph, *Techniques of Model-Based Control*, Prentice Hall, 2002, depicts an example representation of a (single-level) model-based control system approach. It is noted that in addition to the specialized signal-flow topology the example model-based control systems comprises a "controller" element (denoted Q) and a "model" element (denoted P*).

In the theory and design of model-based control systems, the rejection and/or damping of various disturbance processes is of particular interest and advantageous. FIG. 14b, adapted from C. Brosilow and B, Joseph, *Techniques of Model-Based Control*, Prentice Hall, 2002, depicts an example variation on the arrangement depicted in FIG. 14a wherein the effects of disturbances $d_p$ are represented and traced through the specialized signal-flow topology.

Various variations are of interest in various potential embodiments, for example the model can be a precise or imprecise analytical model, a fuzzy model, the outcome of a learning system process, stochastic automata, artificial neural net, genetic algorithm, etc.

Accordingly, the implementation provides for the controller associated with a given subsystem to internally comprise a model-based control system within the 'dynamics component' of the controller in a particular embodiment or as a general feature.

Figure 19:
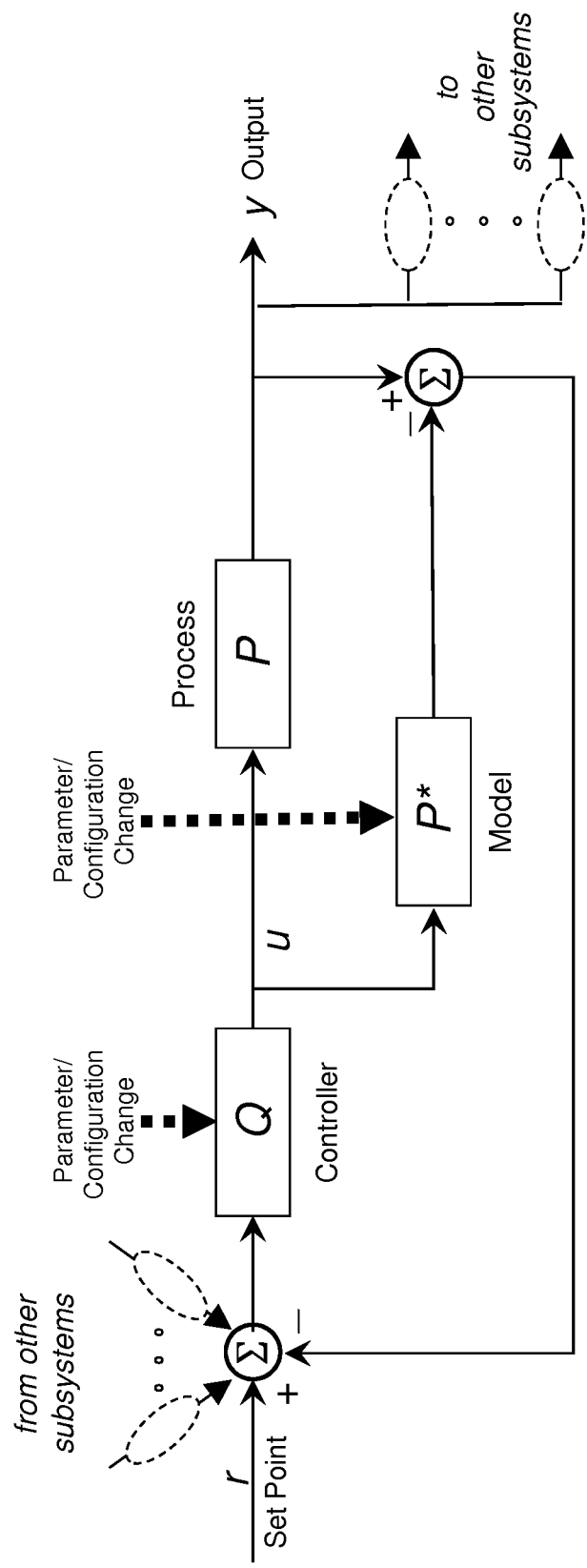
FIG. 19 depicts an adaptation of model-based control system suitable for use in a hierarchical control system.

Additionally, the implementation provides for the controller portion of the model-based control system additional inputs are provided by other subsystems and additional outputs are provided to other subsystems, for example as depicted in FIG. 19. Each dashed oval represent operations such as scaling, offset, dynamical filtering, state-variable selection/suppression, etc. that can be relevant in various designs, implementations, and embodiments. The input and additional output information can be exchanged between and/or among subsystems employing one or more types of communication arrangements described earlier in Section 2.

Further, the representation depicted in FIG. 19 provides for changes to parameters and/or configuration of the controller dynamics responsive to the presence or existence of other subsystems (in other layers of the hierarchy, same layer of the hierarchy, etc.) in various implementations and embodiments.

As pointed out earlier, a formal way to model provisions for making changes to parameters and/or configuration of the system dynamics and/or controller dynamics is with a "bilinear control system" representation. It is again noted that bilinear control systems provide a natural framework for implementing piecewise-linear control systems as can be seen from the product terms involve products of state variables and bilinear control inputs, and that bilinear control systems provide a natural framework for approximating nonlinear systems.

Yet further, the representation depicted in FIG. 19 provides for changes to parameters and/or configuration of the model responsive to the presence or existence of other subsystems (in other layers of the hierarchy, same layer of the hierarchy, etc.) in various implementations and embodiments. Here, too, it is noted that bilinear control systems provide a natural framework for implementing piecewise-linear control systems as can be seen from the product terms involve products of state variables and bilinear control inputs, and that bilinear control systems provide a natural framework for approximating nonlinear systems.

Similarly to as just described, a formal way to model provisions for making changes to parameters and/or configuration of the model is with a "bilinear control system" representation. It is again noted that bilinear control systems provide a natural framework for implementing piecewise-linear control systems as can be seen from the product terms involve products of state variables and bilinear control inputs, and that bilinear control systems provide a natural framework for approximating nonlinear systems.

Further, as described earlier, the implementation provides for the model to comprise hysteresis.

Yet further, as described earlier, the implementation provides for the model to comprise numerical approximations to fractional-order dynamics.

8. Example Implementations

In an example implementation, the implementation comprises a control system arrangement for a hierarchical multiple-level system, the control system arrangement comprising:

A first control system associated with a first subsystem, the first subsystem having provisions to connect with another subsystem, the first control system configured to operate the first subsystem in isolation and further comprising a control system interconnection interface for connection with another control system;

A second control system associated with a second subsystem, the second subsystem having provisions to connect with another subsystem, the second control system configured to operate the second subsystem in isolation and further comprising a control system interconnection interface for connection with another control system;

wherein the first control system and second control system are configured to interconnect with each other via their respective control system interconnection interfaces and, when so interconnected, collectively operate as a hierarchical control system for the combined system resulting from the connection of the first subsystem and second subsystem.

In an example of further implementation details provided for by the implementation, at least one of the first control system and second control systems further comprises a bilinear control system.

In another example of further implementation details provided for by the implementation, at least one of the first control system and second control systems further comprises a nonlinear control system.

In another example of further implementation details provided for by the implementation, at least one of the first control system and second control systems further comprises a model-based control system.

In another example of further implementation details provided for by the implementation, at least one of the first control system and second control systems further comprises a fractional-order control system. As further example implementation details provided for by the implementation, the fractional-order control system comprises a fractional-order Proportional-Integral-Derivative (PID) controller.

In another example of further implementation details provided for by the implementation, at least one of the first control system and second control systems further comprises hysteresis.

In another example of further implementation details provided for by the implementation, at least one of the first control system and second control systems further comprises saturation compensation.

In another example of further implementation details provided for by the implementation, both the first control system and second control system are provided predefined roles in the resulting hierarchical control system.

In another example of further implementation details provided for by the implementation, a third control system associated with a third subsystem can be included, the third subsystem having provisions to connect with another subsystem, the third control system configured to operate the third subsystem in isolation and further comprising a control system interconnection interface for connection with another control system, wherein the first control system and third control system are configured to interconnect with each other via their respective control system interconnection interfaces and, when so interconnected, collectively operate as a hierarchical control system for the combined system resulting from the connection of the first subsystem and third subsystem.

In another example of further implementation details provided for by the implementation, a third control system associated with a third subsystem can be included, the third subsystem having provisions to connect with another subsystem, the third control system configured to operate the third subsystem in isolation and further comprising a control system interconnection interface for connection with another control system, wherein the second control system and third control system are configured to interconnect with each other via their respective control system interconnection interfaces and, when so interconnected, collectively operate as a hierarchical control system for the combined system resulting from the connection of the second subsystem and third subsystem.

Additionally, for example, the second control system and third control system can be configured to interconnect with each other via their respective control system interconnection interfaces and, when so interconnected, collectively operate as a three-level hierarchical control system for the combined system resulting from the connection of the second subsystem and third subsystem together with the connection of the first subsystem and second subsystem.

Similarly, yet more control systems associated with associated additional subsystems can be included. These can be introduced in established levels of the hierarchy, add new levels to the hierarchy, be or inserted within the hierarchy so as to create entirely new levels in the hierarchy.

As an example where a new control system is inserted to create entirely new levels within the hierarchy, the second control system and third control system can be configured to interconnect with each other via their respective control system interconnection interfaces and, when so interconnected, subsequently collectively operate as a three-level hierarchical control system for the combined system resulting from the connection of the second subsystem and third subsystem together with the connection of the first subsystem and the third subsystem, wherein the first control system interacts with the newly added third control system, and the second control system interacts with the newly added third control system rather than the first control system as was the situation prior to the addition of the third control system and third subsystem 9. Example Applications An example application of the implementation includes, for example, hierarchical cooling and energy harvesting systems for data centers and other applications wherein various elements in the hierarchy can be introduced and/or removed arbitrarily, for example as taught in pending U.S. patent application Ser. No. 13/385,411.

Additional applications of the implementation include networked high-reliability control systems, robotics systems, automotive systems, chemical processing plants, bioreactor systems, aerospace systems, networked sensor systems, adaptive communications networks, high-reliability communications networks, and command-and-control applications. Each of these is an excellent candidate for the features.

CLOSING

The terms "certain embodiments," "an embodiment," "embodiment", "embodiments," "the embodiment," "the embodiments," "one or more embodiments," "some embodiments," and "one embodiment" mean one or more (but not all) embodiments unless expressly specified otherwise. The terms "including," "comprising," "having," and variations thereof mean "including but not limited to" unless expressly specified otherwise. The enumerated listing of items does not imply that any or all of the items are mutually exclusive, unless expressly specified otherwise. The terms "a," "an," and "the" mean "one or more" unless expressly specified otherwise.

The foregoing description, for purpose of explanation, has been described with reference to specific embodiments. However, the illustrative discussions above are not intended to be exhaustive or to limit the implementation to the precise forms disclosed. Many modifications and variations are possible in view of the above teachings. The embodiments were chosen and described in order to best explain the principles of the implementation and its practical applications, to thereby enable others skilled in the art to best utilize the implementation and various embodiments with various modifications as are suited to the particular use contemplated.

While the implementation has been described in detail with reference to disclosed embodiments, various modifications within the scope of the inventive concept will be apparent to those of ordinary skill in this technological field. It is to be appreciated that features described with respect to one embodiment typically can be applied to other embodiments.

The inventive concept can be embodied in other specific forms without departing from the spirit or essential characteristics thereof. The present embodiments are therefore to be considered in all respects as illustrative and not restrictive, the scope of the inventive concept being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the implementation properly is to be construed with reference to the claims.

The invention claimed is:

1. A control system arrangement comprising:
a first control system and a second control system configured to connect and disconnect with each other, and exchange at least supervisory control information, via respective control system interconnection interfaces;
a first controller of the first control system associated with a first hardware system, the first controller configured to control the first hardware system;
a second controller of the second control system associated with a second hardware system, the second controller configured to control second hardware system;
wherein the first controller is configured to control the first hardware system in isolation from any other control system, wherein the second controller is configured to control the second hardware system in isolation from any other control system, and wherein, when the second control system is connected to the first control system, the first and second controllers are configured to negotiate respective roles within a hierarchy and automatically configure themselves into the hierarchy according to their respective roles.

2. The control system arrangement of claim 1, wherein at least one of the first control system and the second control system comprises a bilinear control system.

3. The control system arrangement of claim 1, wherein at least one of the first control system and the second control system comprises a nonlinear control system.

4. The control system arrangement of claim 1, wherein at least one of the first control system and the second control system comprises a model-based control system.

5. The control system arrangement of claim 1, wherein at least one of the first control system and the second control system comprises a fractional-order control system.

6. The control system arrangement of claim 5, wherein the fractional-order control system comprises a fractional-order Proportional-Integral-Derivative (PID) controller.

7. The control system arrangement of claim 1, wherein at least one of the first control system and the second control system implements hysteresis.

8. The control system arrangement of claim 1, wherein at least one of the first control system and the second control system performs saturation compensation.

9. The control system arrangement of claim 1, wherein both the first control system and the second control system are provided predefined roles in the resulting hierarchy.

10. The control system arrangement of claim 1, wherein at least one of the first subsystem and the second subsystem are a bilinear control system.

* * * * *